(12) United States Patent
Kim et al.

(10) Patent No.: US 11,172,514 B2
(45) Date of Patent: Nov. 9, 2021

(54) METHOD AND APPARATUS FOR RANDOM ACCESS IN MOBILITY IN WIRELESS COMMUNICATION SYSTEM

(71) Applicant: LG ELECTRONICS INC., Seoul (KR)

(72) Inventors: Hongsuk Kim, Seoul (KR); Youngdae Lee, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 31 days.

(21) Appl. No.: 16/749,739

(22) Filed: Jan. 22, 2020

(65) Prior Publication Data
US 2020/0236719 A1 Jul. 23, 2020

(30) Foreign Application Priority Data

Jan. 22, 2019 (KR) .................. 10-2019-0008274
Jan. 22, 2019 (KR) .................. 10-2019-0008291
Jan. 22, 2019 (KR) .................. 10-2019-0008310

(51) Int. Cl.
*H04W 74/08* (2009.01)
*H04W 36/00* (2009.01)
*H04W 52/36* (2009.01)

(52) U.S. Cl.
CPC .......... *H04W 74/0833* (2013.01); *H04W 36/0005* (2013.01); *H04W 52/36* (2013.01)

(58) Field of Classification Search
CPC ........... H04W 36/00; H04W 36/0005; H04W 36/0083; H04W 36/00837; H04W 36/34; H04W 36/36
See application file for complete search history.

(56) References Cited

U.S. PATENT DOCUMENTS

| 2014/0098752 A1* | 4/2014 | Venkata ............... H04W 52/04 370/329 |
| 2019/0297537 A1* | 9/2019 | Tsai ..................... H04W 76/27 |
| 2020/0029292 A1* | 1/2020 | Zou ..................... H04W 72/046 |
| 2020/0107235 A1* | 4/2020 | Peisa ................... H04W 74/0833 |
| 2021/0068016 A1* | 3/2021 | Shi ....................... H04W 24/10 |
| 2021/0112598 A1* | 4/2021 | Ryu ..................... H04W 76/30 |

OTHER PUBLICATIONS

Ericsson, "RACH-less handover robustness", 3GPP TSC-RAN WG2#104, Tdoc R2-1817397, Nov. 2018, pp. 1-3. (Year: 2018).*
Samsung, "RACH-less enhancements for reduced interruption time", 3GPP TSG-RAN WG2 Meeting #104, R2-1816297, Nov. 2018, pp. 1-2. (Year: 2018).*

* cited by examiner

*Primary Examiner* — Robert C Scheibel
(74) *Attorney, Agent, or Firm* — Lee, Hong, Degerman, Kang & Waimey

(57) ABSTRACT

The present disclosure relates to random access in mobility in wireless communications. According to an embodiment of the present disclosure, a method performed by a wireless device comprises: receiving, from a network, skip information for a random access channel (RACH) and information for a revert timer; performing a RACH-less handover to a target cell based on the skip information and starting the revert timer; determining that the RACH-less handover stops while the revert timer is running; and upon an expiry of the revert timer, transmitting a random access preamble with a ramped transmission power, wherein the ramped transmission power is higher than an initial transmission power of the random access preamble.

13 Claims, 20 Drawing Sheets

METHOD AND APPARATUS FOR RANDOM ACCESS IN MOBILITY IN WIRELESS COMMUNICATION SYSTEM

CROSS-REFERENCE TO RELATED APPLICATIONS

Pursuant to 35 U.S.C. § 119(a), this application claims the benefit of earlier filing date and right of priority to Korean Patent Application Nos. 10-2019-0008310, filed Jan. 22, 2019, 10-2019-0008274, filed on Jan. 22, 2019, and 10-2019-0008291, filed on Jan. 22, 2019, the contents of which are hereby incorporated by reference herein in its entirety.

BACKGROUND OF THE DISCLOSURE

Field of the Disclosure

The present disclosure relates to random access in mobility in wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

As UE may move along many cells in wireless communication system, a serving cell quality for the UE may be degraded while a neighbor cell quality for the UE may be enhanced. In this case, the UE may perform a mobility from the source cell to the neighbor cell in order to be served by a better quality. In a mobility procedure, the UE may perform a random access towards a target cell for a mobility for e.g., uplink synchronization with the target cell. However, the UE may also perform a mobility to the target cell without performing the random access. This may be referred to as RACH-less mobility.

SUMMARY OF THE DISCLOSURE

Technical Problem

An aspect of the present disclosure is to provide method and apparatus for random access in mobility in wireless communication system.

Another aspect of the present disclosure is to provide method and apparatus for performing a random access upon terminating a RACH-less mobility in a wireless communication system.

Another aspect of the present disclosure is to provide method and apparatus for setting an initial transmission power of a random access preamble in a random access procedure that is performed upon terminating RACH-less mobility in a wireless communication system.

Technical Solution

According to an embodiment of the present disclosure, a method performed by a wireless device comprises: receiving, from a network, skip information for a random access channel (RACH) and information for a revert timer; performing a RACH-less handover to a target cell based on the skip information and starting the revert timer; determining that the RACH-less handover stops while the revert timer is running; and upon an expiry of the revert timer, transmitting a random access preamble with a ramped transmission power, wherein the ramped transmission power is higher than an initial transmission power of the random access preamble.

According to an embodiment of the present disclosure, a wireless device in a wireless communication system comprises: a transceiver; a memory; and at least one processor operatively coupled to the transceiver and the memory, and configured to: control the transceiver to receive, from a network, skip information for a random access channel (RACH) and information for a revert timer, perform a RACH-less handover to a target cell based on the skip information and starting the revert timer, determine that the RACH-less handover stops while the revert timer is running, and control the transceiver to transmit, upon an expiry of the revert timer, a random access preamble with a ramped transmission power, wherein the ramped transmission power is higher than an initial transmission power of the random access preamble.

According to an embodiment of the present disclosure, a processor for a wireless device in a wireless communication system is configured to control the wireless device to perform operations comprising: receiving, from a network, skip information for a random access channel (RACH) and information for a revert timer; performing a RACH-less handover to a target cell based on the skip information and starting the revert timer; determining that the RACH-less handover stops while the revert timer is running; and upon an expiry of the revert timer, transmitting a random access preamble with a ramped transmission power, wherein the ramped transmission power is higher than an initial transmission power of the random access preamble.

Advantageous Effect

The present disclosure can have various advantageous effects.

For example, the wireless device transmits a random access preamble with a ramped transmission power instead of an initial transmission power upon terminating a RACHless handover so that the radio link failure can be prevented, data latency can be reduced (i.e., almost 0 ms delay in performing handover can be achieved), and more successful handover can be performed.

If UE performs RACH-less handover during a time period within a validity period (i.e., while validity timer is running) and then performs RACH-based handover during the rest of the validity period after terminating the RACH-less handover, the UE can use limited time (i.e., the rest of the validity period) for performing the RACH-based handover. During the limited time period, the UE is able to perform more successful handover using the updated transmission power to transmit random access preamble even though RACH-less handover is failed. According to various embodiments, the UE is able to transmit more powerful transmission for random access to the target cell and there are more possibilities to succeed handover.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
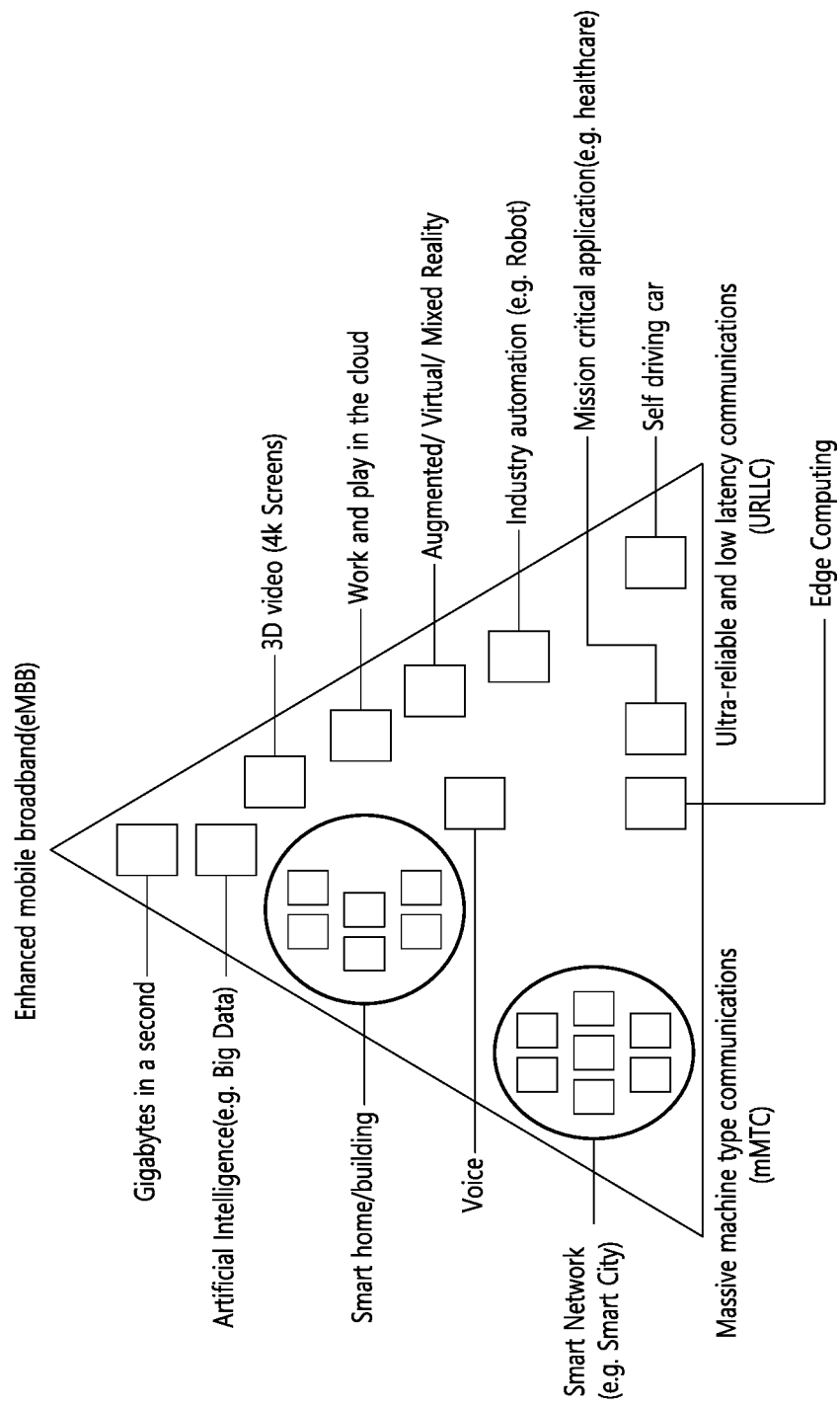
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C". In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

'Mobility' refers to a procedure for i)changing a PCell of a UE (i.e., handover or PCell change), ii)changing a PSCell of a UE (i.e., SN change or PSCell change), and/or iii)adding a PSCell for a UE (i.e., SN addition or PSCell addition). Therefore, the mobility may comprise at least one of a handover, an SN change or an SN addition. In other words, the mobility may comprise at least one of PCell change, PSCell change or PSCell addition. Throughout the disclosure, performing a mobility to a target cell may refer to applying a mobility command of the target cell or applying RRC reconfiguration parameters in the mobility command of the target cell. Further, RRC reconfiguration and RRC connection reconfiguration may be used interchangeably.

'RACH-less mobility' refers to a mobility that is performed to a target cell without performing a random access for the target cell. That is, RACHless mobility refers to a mobility that is performed to a target cell while/by skipping a random access for the target cell. The difference between RACH-based mobility (i.e., a mobility that is performed to a target cell while/by performing a random access for the target cell) and RACH-less mobility is explained below:

1) RACH-Based Mobility

After receiving a mobility command for a target cell from a source cell, the wireless device may transmit a random access preamble to the target cell, and in response, receive a random access response comprising an uplink grant from the target cell. The wireless device may transmit a mobility complete message to the target cell based on the uplink grant in the random access response.

2) RACH-Less Mobility

The wireless device may receive a mobility command for a target cell from a source cell. Herein, the mobility command may comprise an uplink grant. For example, the target cell may transmit a mobility request acknowledge (ACK) message comprising the uplink grant determined by the target cell to the source cell, and the source cell may transmit the mobility command comprising the uplink grant received from the target cell to the wireless device. The wireless device may skip performing a random access for the target cell (i.e., skip transmitting a random access preamble to the target cell and receiving a random access response from the target cell), and transmit a mobility complete message to the target cell based on the uplink grant in the mobility command.

'Mobility command' is a kind of a RRC connection reconfiguration (or, RRC reconfiguration) message. Mobility complete message is a kind of a RRC connection reconfiguration complete (or, RRC reconfiguration complete) message.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'RACH' and 'random access' may be used interchangeably.

Throughout the disclosure, features illustrated for handover exemplary can also be applied to mobility.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
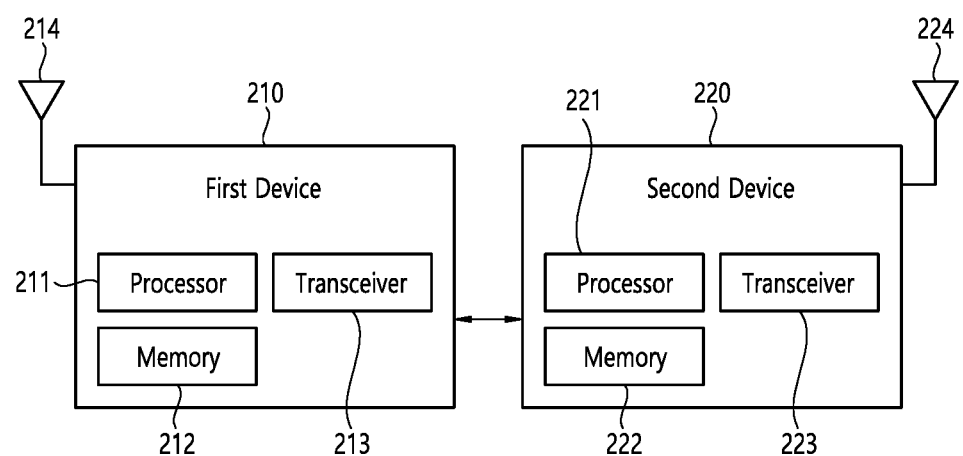
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
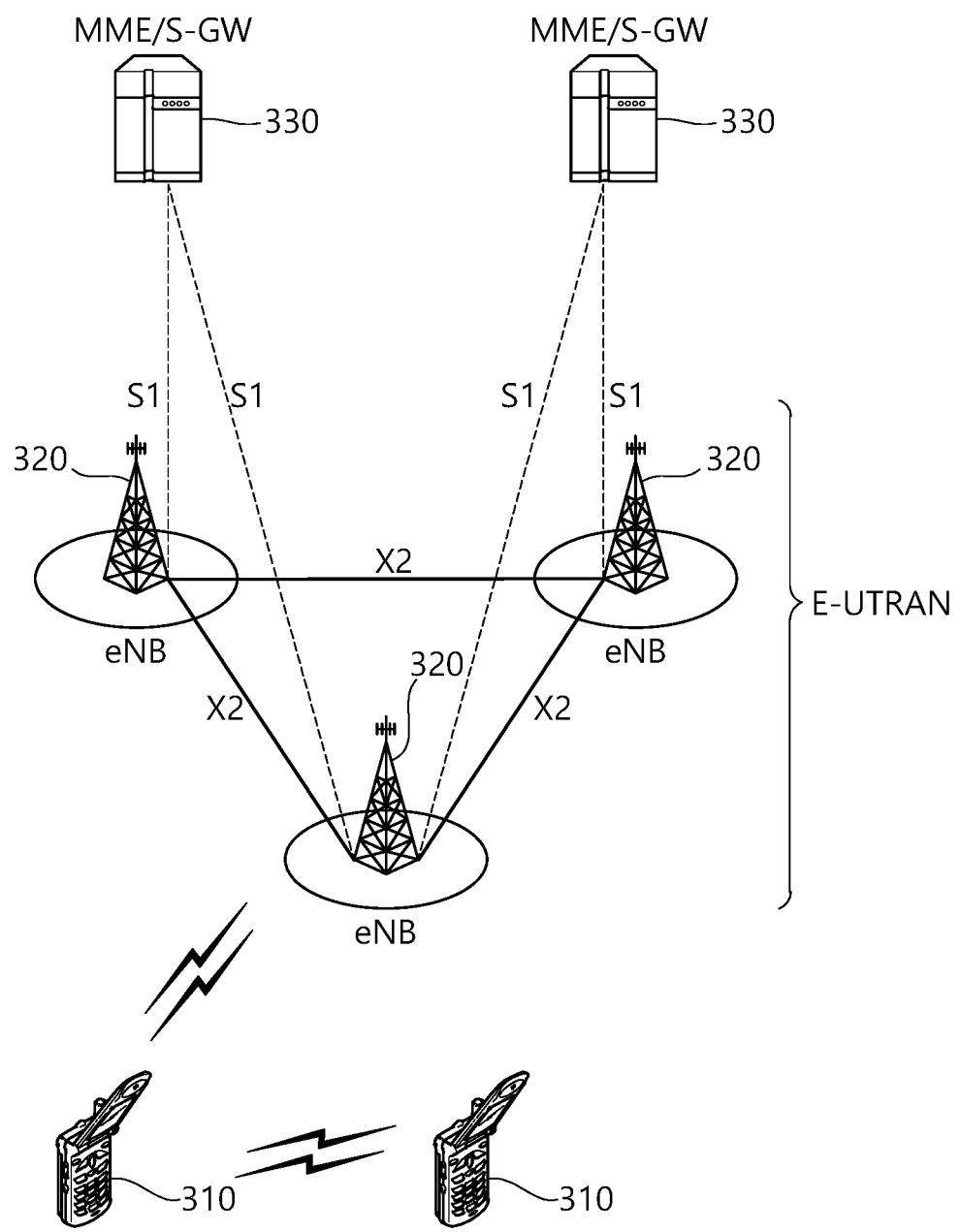
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
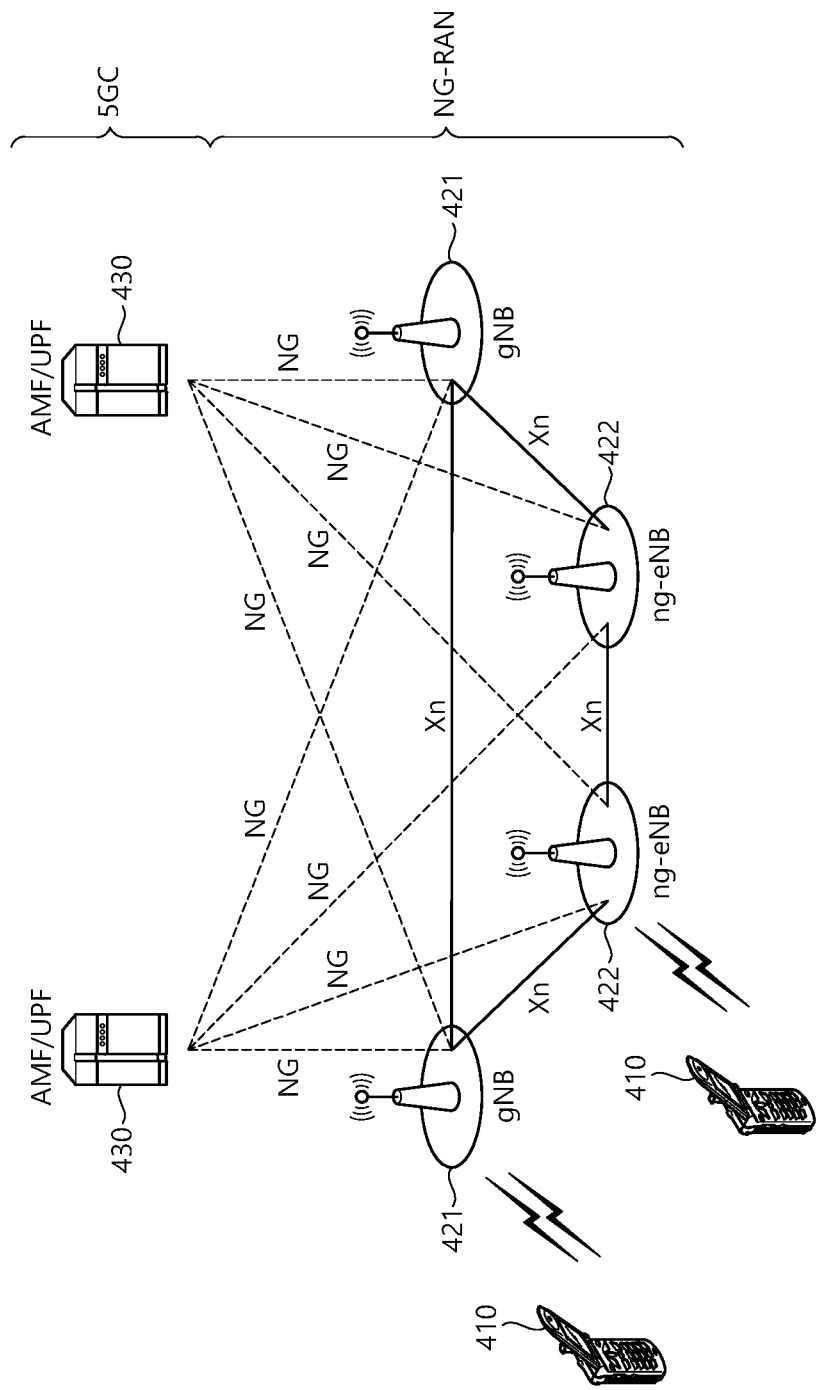
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NW") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
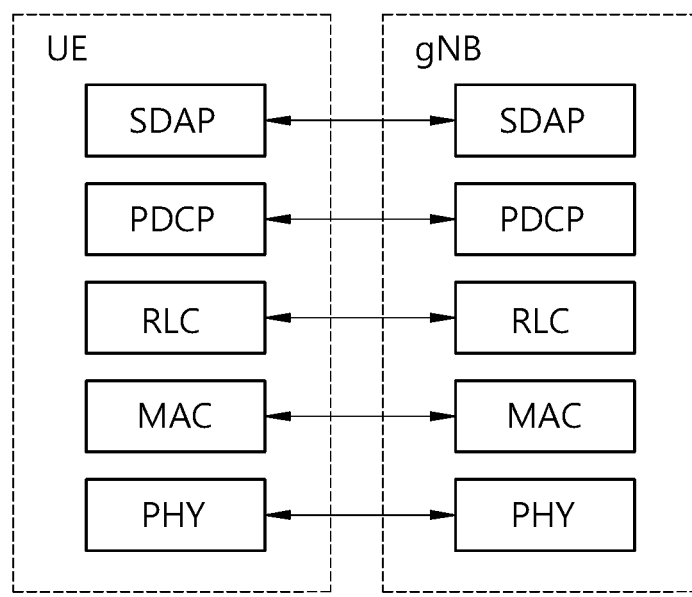
FIG. 5 shows a block diagram of a user plane protocol stack to which the technical features of the present disclosure can be applied.
Figure 6:
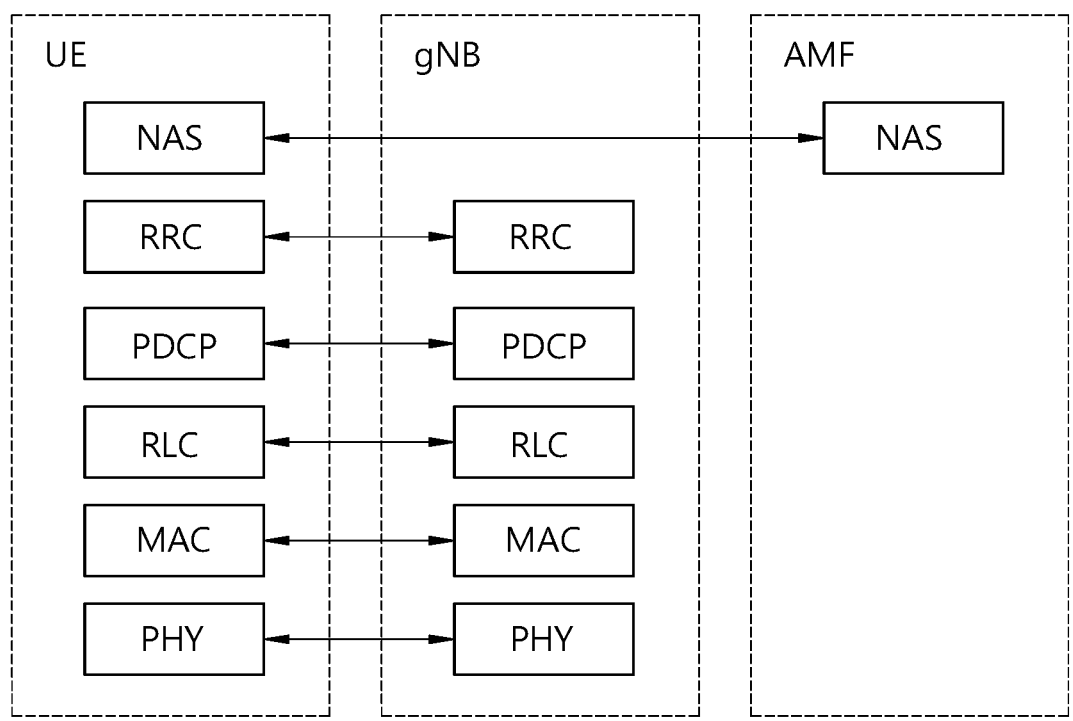
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
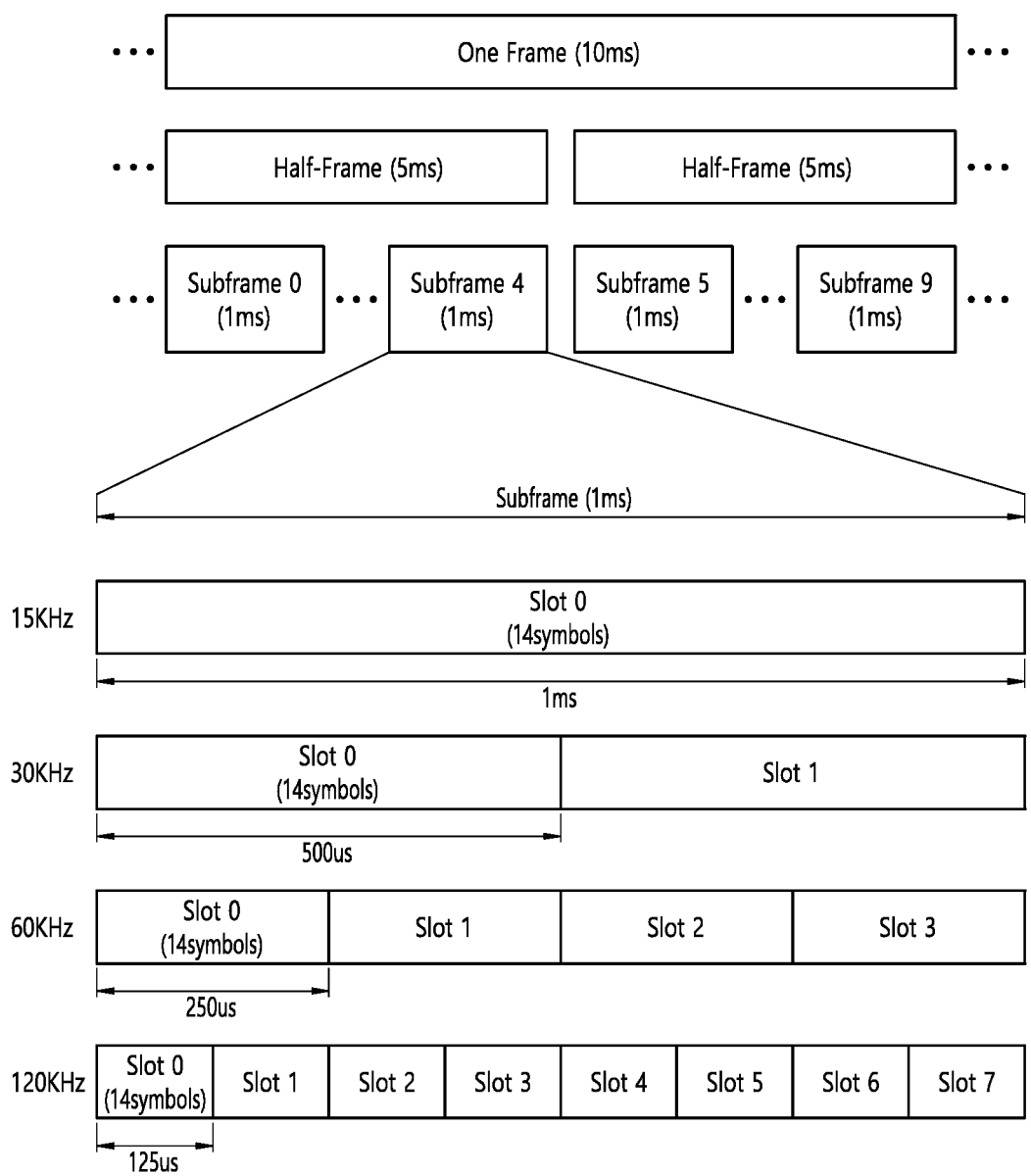
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2u*15$ kHz. The following table shows the number of OFDM symbols per slot, the number of slots per frame, and the number of slots per for the normal CP, according to the subcarrier spacing $\Delta f = 2u*15$ kHz.

TABLE 3

| u | Nslotsymb | Nframe, uslot | Nsubframe, uslot |
|---|---|---|---|
| 0 | 14 | 10 | 1 |
| 1 | 14 | 20 | 2 |
| 2 | 14 | 40 | 4 |
| 3 | 14 | 80 | 8 |
| u | Nslotsymb | Nframe, uslot | Nsubframe, uslot |

The following table shows the number of OFDM symbols per slot, the number of slots per frame, and the number of slots per for the extended CP, according to the subcarrier spacing $\Delta f = 2u*15$ kHz.

TABLE 4

| u | Nslotsymb | Nframe, uslot | Nsubframe, uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid, x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index 1 representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i-1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
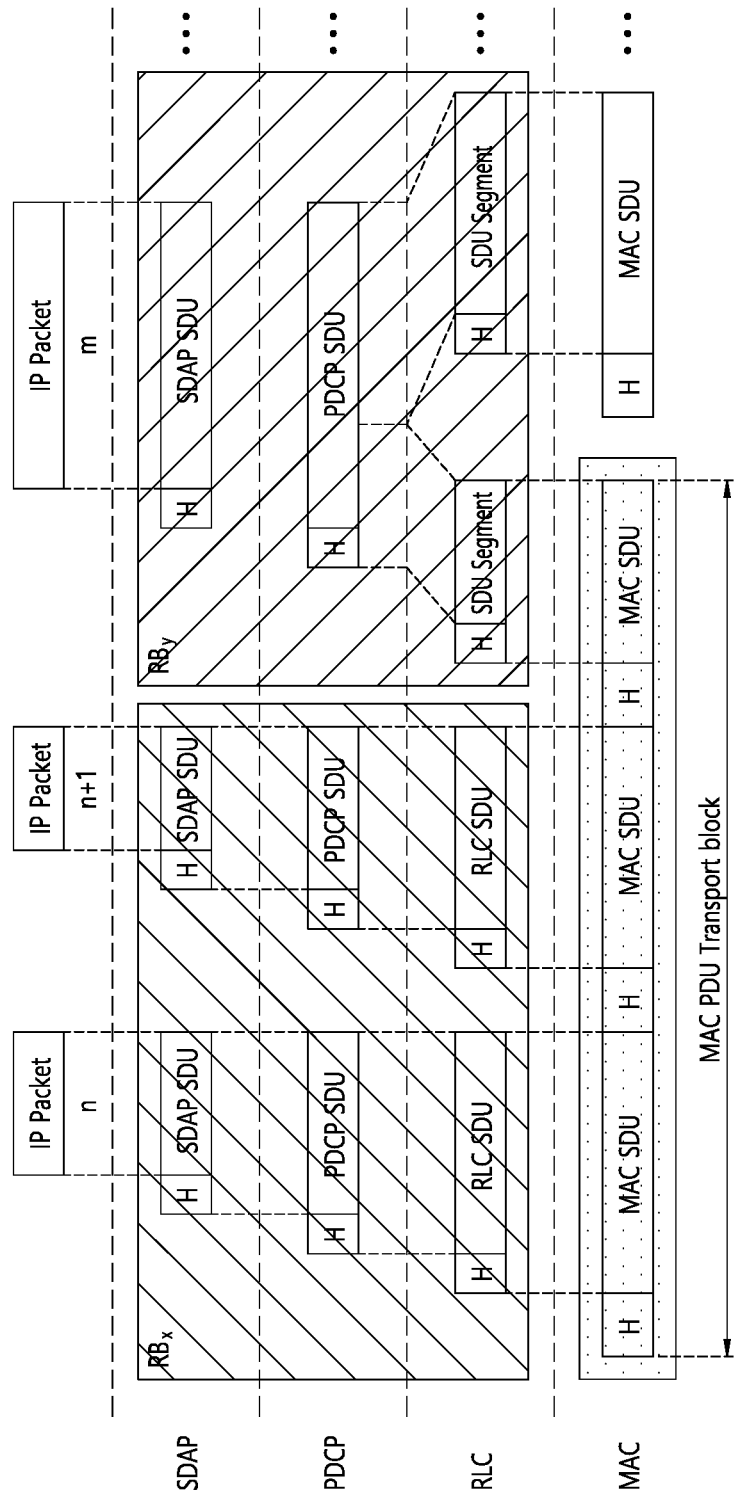
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Figure 9:
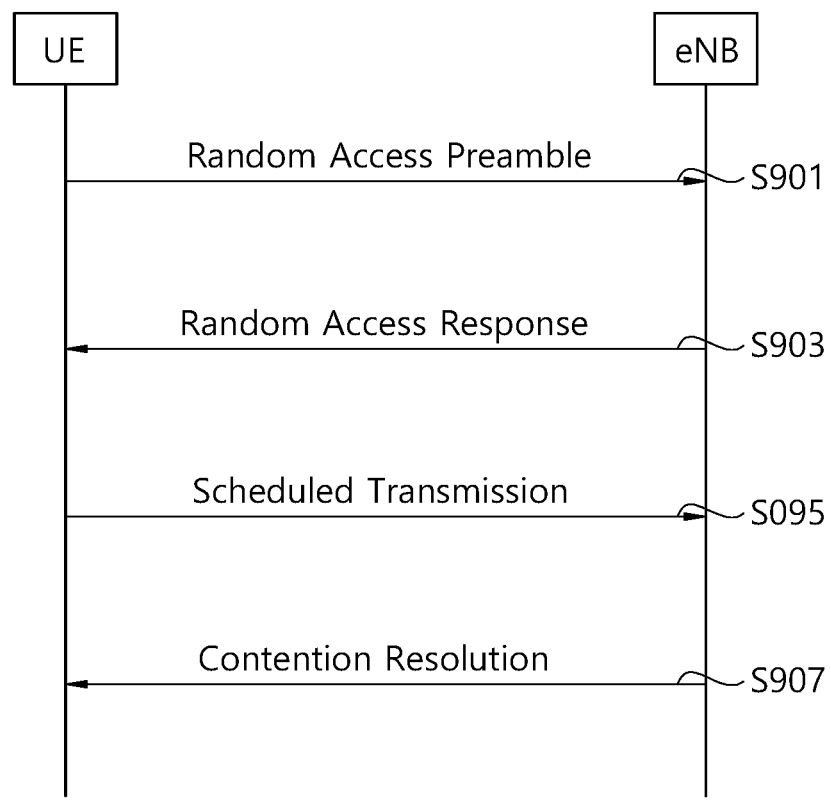
FIG. 9 shows an example of contention-based random access procedure to which technical features of the present disclosure can be applied.

FIG. 9 shows an example of contention-based random access procedure to which technical features of the present disclosure can be applied.

Referring to FIG. 9, in step S901, The UE may transmit a random access preamble (msg1) on RACH in uplink, to an evolved node B (eNB). There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.

In step S903, The UE may receive a random access response (msg2) generated by MAC on downlink-shared channel (DL-SCH), from the eNB. The random access response may be Semi-synchronous (within a flexible window of which the size is one or more transit time interval (TTI)) with the msg1. The random access response message comprises at least one of a random access preamble identifier, timing alignment information for a primary timing advance group (pTAG), initial uplink (UL) grant and assignment of temporary C-RNTI.

In step S905, the UE may transmit a device identification message (msg3) to the eNB. The device identification message may be a first scheduled UL transmission on UL-SCH. For initial access, the device identification message may comprise at least a NAS UE identifier. If the UE is in the RRC_CONNECTED state and has a C-RNTI, the device identification message may include the C-RNTI.

In step S907, the UE may receive a contention resolution message (msg4) from the eNB. The contention resolution message may be addressed to the temporary C-RNTI on PDCCH for initial access and after radio link failure, or addressed to the C-RNTI on PDCCH for UE in RRC_CONNECTED state. The temporary C-RNTI is promoted to C-RNTI for a UE which detects RA success and does not already have a C-RNTI. A UE which detects RA success and already has a C-RNTI resumes using the C-RNTI.

Figure 10:
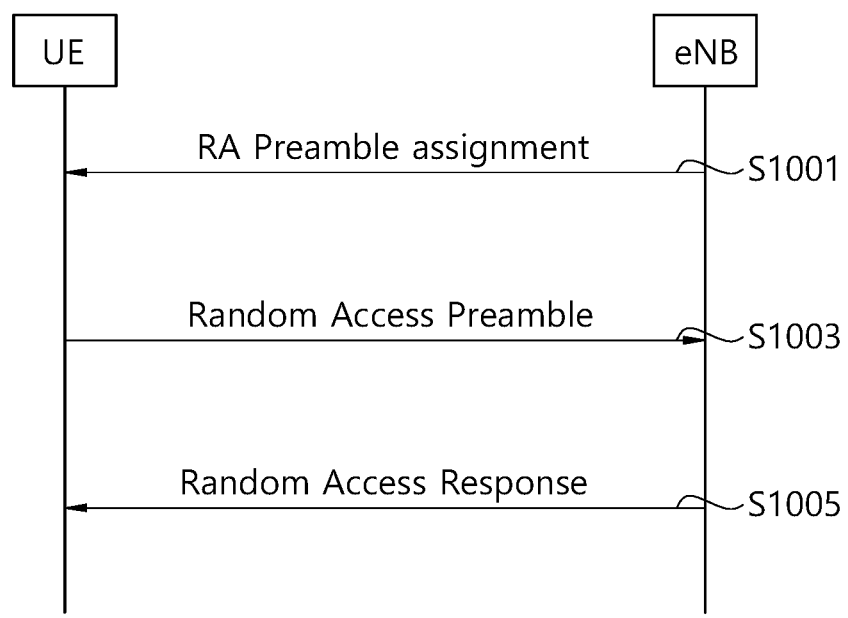
FIG. 10 shows an example of contention-free random access procedure to which technical features of the present disclosure can be applied.

FIG. 10 shows an example of contention-free random access procedure to which technical features of the present disclosure can be applied.

Referring to FIG. 10, in step S1001, the UE may receive a random access preamble assignment via dedicated signalling in DL, from the eNB. The eNB may assign to UE a non-contention random access preamble (i.e., a random access preamble not within the set sent in broadcast signalling).

In step S1003, the UE may transmit a random access preamble (msg1) on RACH in uplink, to the eNB. The UE transmits the assigned non-contention random access preamble.

In step S1005, the UE may receive a random access response (msg2) on DL-SCH, from the eNB. The random access response message may comprise at least one of timing alignment information and UL grant for handover, timing alignment information for DL data arrival, or random access preamble identifier.

According to various embodiments, if RACH-less handover is performed to a target cell, steps S1001, S1003 and S1005 may be omitted in a procedure for accessing to the target cell. In this case, the UE may receive a RRC connection reconfiguration (or, RRC reconfiguration) message comprising a UL grant together with a handover command from a source cell, and may transmit a handover complete message to the target cell based on the UL grant after applying the handover command.

As illustrated in FIGS. 9-10, UE may transmit a random access preamble to a RAN node for e.g., an uplink synchronization with the RAN node in step S901 or S1003. The UE may transmit the random access preamble with a transmission power, PREAMBLE_RECEIVED_TARGET_POWER. To set the PREAMBLE_RECEIVED_TARGET_POWER, the UE shall:

1> set PREAMBLE_RECEIVED_TARGET_POWER to preambleInitialReceivedTargetPower+DELTA_PREAMBLE+(PREAMBLE_TRANSMISSION_COUNTER-1) * powerRampingStep;
  1> if the UE is a BL UE or a UE in enhanced coverage:
    2> the PREAMBLE_RECEIVED_TARGET_POWER is set to: PREAMBLE_RECEIVED_TARGET POWER 10 log 10(numRepetitionPerPreambleAttempt);
  1> if the UE is an NB-IoT UE:
    2> for enhanced coverage level 0, the PREAMBE_RECEIVED_TARGET_POWER is set to: PREAMBE_RECEIVED_TARGET_POWER-10* log 10(numRepetitinPerPreabeAttempt);
    3> if the UE supports enhanced random access power control and PowerRampingParameters-NB-v1450 is configured by upper layers:
      4> the MSG3_RECEIVED_TARGET_POWER is set to preambleInitialReceivedTargetPower+(PREAMBLE TRANSMISSION_COUNTER CE-1) * powerRampingStep;
    2> for other enhanced coverage levels:
    3> if the UE supports enhanced random access power control and PowerRampingParameters-NB-v1450 is configured by upper layers; and
      3> if the starting enhanced coverage level was enhanced coverage level 0 or enhanced coverage level 1:
        4> if the MAC entity considers itself to be in enhanced coverage level 1 and if powerRampingStepCE1 and preambleInitialReceivedTargetPowerCE1 have been configured by upper layers:
          5> the PREAMBE_RECEIVED_TARGET_POWER is set to preambleInitialReceivedTargetPowerCE1+DELTA PREAMBLE+(PREAMBLE_TRANSMISSION_COUNTER_CE-1) * powerRampingStepCE1-10* log10(numRepetitinPerPreabeAttempt);
          5> the MSG3 RECEIVED TARGET POWER is set to preambleInitialReceivedTargetPowerCE1 (PREAMBLE_TRANSMISSION_COUNTER_CE-1) * powerRampingStepCE1;
        4> else:
          5> the PREAMBE_RECEIVED_TARGET_POWER is set to preambleInitialReceivedTargetPower+DELTA_PREAMBLE+(PREAMBLE_TRANSMISSION_COUNTER_CE-1) * powerRampingStep-10* log10(numRepetitinPerPreabeAttempt);
          5> the MSG3 RECEIVED TARGET POWER is set to preambleInitialReceivedTargetPower+(PREAMBLE TRANSMISSION COUNTER CE-1) * powerRampingStep;
      3> else:
        4> the PREAMBLE_RECEIVED_TARGET_POWER is set corresponding to the max UE output power;
  1> if the UE is an NB-IoT UE, a BL UE or a UE in enhanced coverage:
    2> instruct the physical layer to transmit a preamble with the number of repetitions required for preamble transmission corresponding to the selected preamble group (i.e., numRepetitionPerPreambleAttempt) using the selected PRACH corresponding to the selected enhanced coverage level, corresponding RA-RNTI, preamble index or for NB-IoT subcarrier index, and PREAMBE_RECEIVED_TARGET_POWER.
  1> else:
    2> instruct the physical layer to transmit a preamble using the selected PRACH, corresponding RA-RNTI, preamble index and PREAMBLE_RECEIVED_TARGET_POWER.

The initial transmission power for a transmission of the random access preamble is determined by setting the PREAMBLE_TRANSMISSION_COUNTER to 1.Whenever each random access attempt fails, the wireless device may ramp up the transmission power by incrementing the PREAMBLE_TRANSMISSION_COUNTER by 1 and re-transmit the random access preamble with the ramped transmission power until the PREAMBLE_TRANSMISSION_COUNTER reaches maximum value (i.e., maximum number of possible random access attempts).

In some mobility situations, UE may receive a handover command comprising a single target cell from a network and perform a handover (or, handover attempt) to the target cell indicated by the network. This handover may be referred to as 'network controlled handover'. The handover command related to the network controlled handover may be referred to as 'network controlled handover command'. Detailed network controlled handover procedure is illustrated in FIGS. 11A-11B.

Figure 11A:
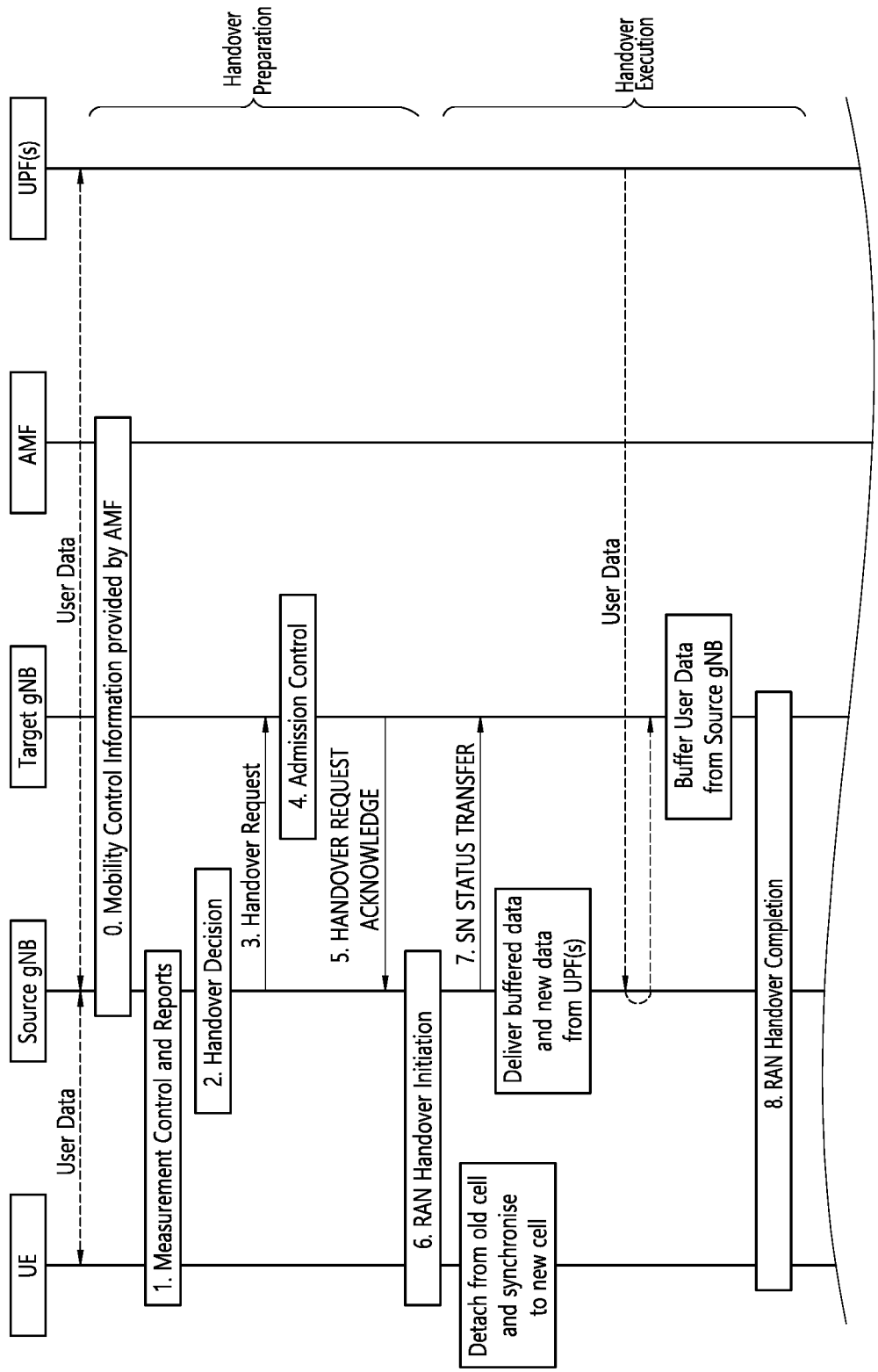
FIGS. 11A-11B show an example of network controlled handover procedure to which technical features of the present disclosure can be applied.
Figure 11B:
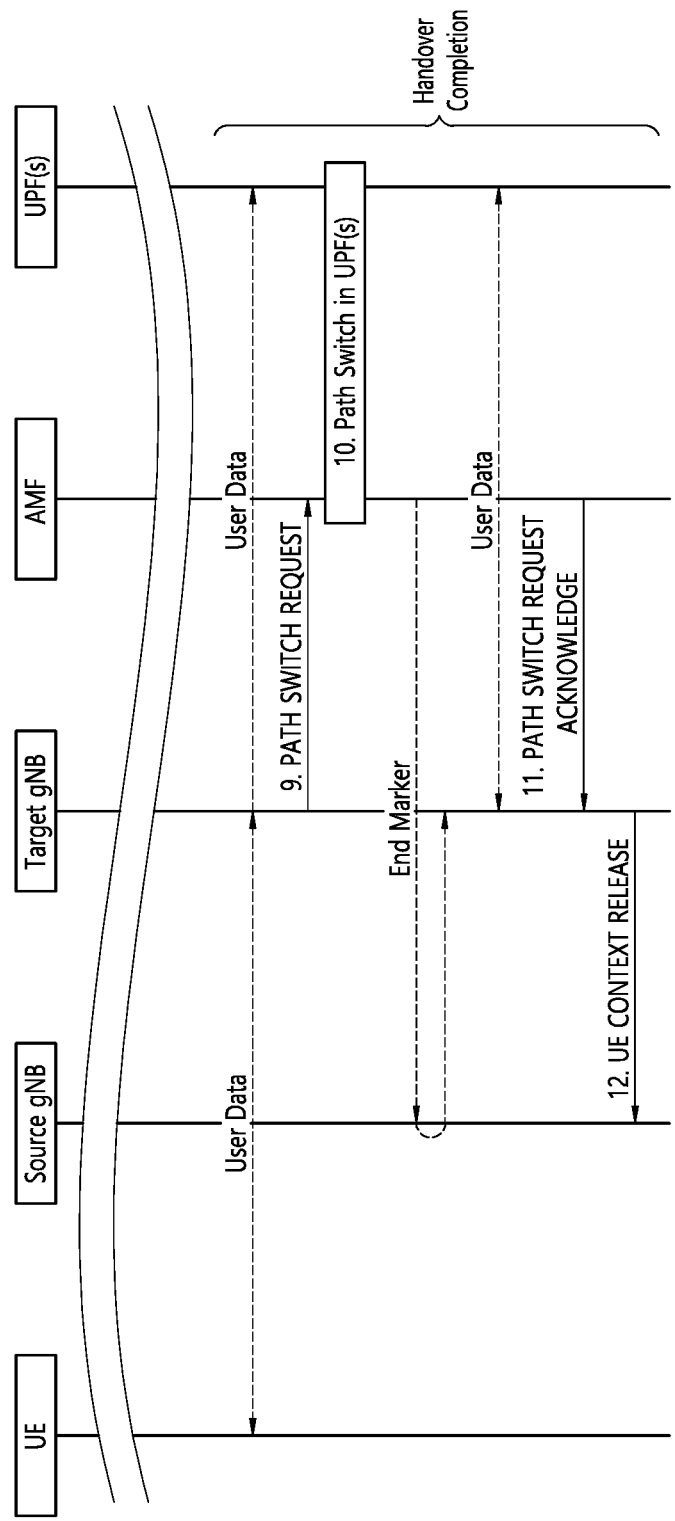

FIGS. 11A-11B show an example of network controlled handover procedure to which technical features of the present disclosure can be applied. Throughout the disclosure, the gNB can be substituted for eNB, cell, RAN node or base station, and both the access and mobility management function (AMF) and user plane function(s) (UPF(s)) can be substituted for a mobility management entity (MME)—that is, steps associated with the AMF and/or the UPF can be associated with the MME.

Referring to FIG. 11A, in step 0, the UE context within the source gNB may contain information regarding roaming and access restrictions which were provided either at connection establishment or at the last tracking area (TA) update.

In step 1, the source gNB may configure the UE measurement procedures and the UE reports according to the measurement configuration.

In step 2, the source gNB may decide to handover the UE, based on MeasurementReport and RRM information.

In step 3, the source gNB may issue a Handover Request message to the target gNB passing a transparent RRC container with necessary information to prepare the handover at the target side. The information may include at least the target cell ID, KgNB*, the C-RNTI of the UE in the source gNB, RRM-configuration including UE inactive time, basic AS-configuration including antenna Info and DL Carrier Frequency, the current QoS flow to DRB mapping rules applied to the UE, the SIB1 from source gNB, the UE capabilities for different RATs, PDU session related information, and can include the UE reported measurement information including beam-related information if available. The PDU session related information may include the slice information and QoS flow level QoS profile(s). After issuing a Handover Request, the source gNB may not reconfigure the UE, including performing Reflective QoS flow to DRB mapping.

In step 4, admission control may be performed by the target gNB. Slice-aware admission control shall be performed if the slice information is sent to the target gNB. If the PDU sessions are associated with non-supported slices the target gNB shall reject such PDU Sessions.

In step 5, the target gNB may prepare the handover with L1/L2 and send the HANDOVER REQUEST ACKNOWLEDGE to the source gNB, which may include a transparent container to be sent to the UE as an RRC message to perform the handover.

In step 6, the source gNB may trigger the Uu handover by sending an RRCReconfiguration message to the UE, containing the information required to access the target cell: at least the target cell ID, the new C-RNTI, the target gNB security algorithm identifiers for the selected security algorithms. It can also include a set of dedicated RACH resources, the association between RACH resources and SSB(s), the association between RACH resources and UE-specific CSI-RS configuration(s), common RACH resources, and system information of the target cell.

After step 6, the UE may detach from old cell (i.e., source gNB) and synchronize to the new cell (i.e., target gNB). The UE may perform a contention-free random access procedure towards the target gNB as illustrated in FIG. 10.

In step 7, the source gNB may send the SN STATUS TRANSFER message to the target gNB.

In step 8, the UE may synchronize to the target cell and complete the RRC handover procedure by sending RRCReconfigurationComplete message to target gNB.

FIG. 11B illustrates steps which continue from the steps illustrated in FIG. 11A.

Referring to FIG. 11B, in step 9, the target gNB may send a PATH SWITCH REQUEST message to AMF to trigger 5GC to switch the DL data path towards the target gNB and to establish an NG-C interface instance towards the target gNB.

In step 10, core network entity(ies)(e.g., AMF, UPF(s) and/or MME) may switch the DL data path towards the target gNB. The UPF may send one or more "end marker" packets on the old path to the source gNB per PDU session/tunnel and then can release any U-plane/transport network layer (TNL) resources towards the source gNB.

In step 11, the AMF may confirm the PATH SWITCH REQUEST message with the PATH SWITCH REQUEST ACKNOWLEDGE message.

In step 12, upon reception of the PATH SWITCH REQUEST ACKNOWLEDGE message from the AMF, the target gNB may send the UE CONTEXT RELEASE to inform the source gNB about the success of the handover. The source gNB can then release radio and C-plane related resources associated to the UE context. Any ongoing data forwarding may continue.

In some mobility situations, UE may receive a handover command comprising a list of candidate target cells (or simply referred to as candidate cells) and handover condition(s), and autonomously perform a handover (or, handover attempt) to a target cell among the candidate cells for which a handover condition is satisfied. This handover may be referred to as 'conditional handover', and the handover command related to the conditional handover may be referred to as 'conditional handover command'. For the conditional handover, the UE may autonomously select the target cell among the candidate cells based on measurements on the candidate cells. Detailed conditional handover procedure is illustrated in FIG. 12.

Figure 12:
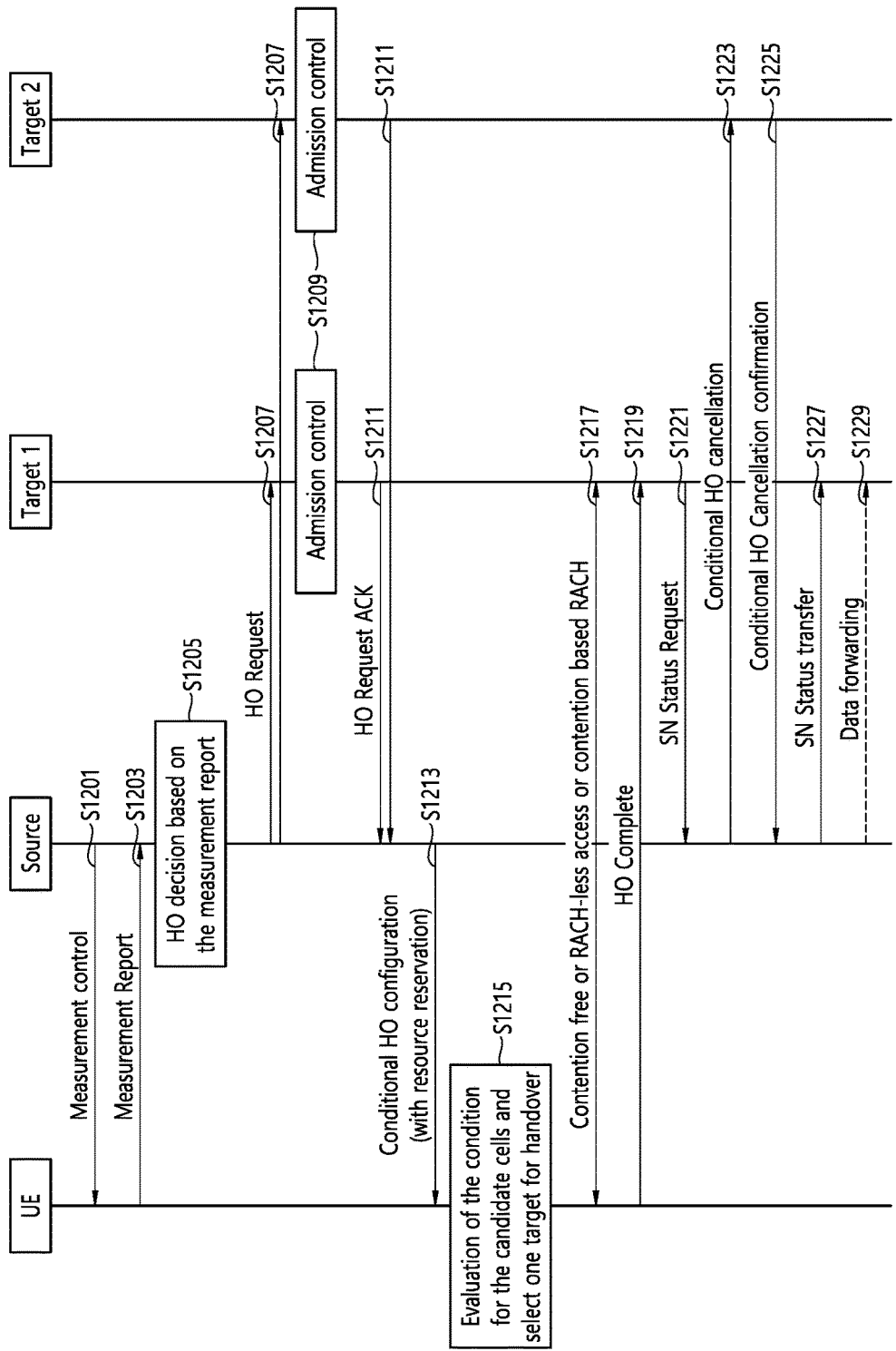
FIG. 12 shows an example of a conditional handover procedure to which technical features of the present disclosure can be applied.

FIG. 12 shows an example of a conditional handover procedure to which technical features of the present disclosure can be applied.

Referring to FIG. 12, in step S1201, the source cell may transmit measurement control message to the UE. The source cell may configure the UE measurement procedures according to the roaming and access restriction information and, for example, the available multiple frequency band information through the measurement control message. Measurement control information provided by the source cell through the measurement control message may assist the function controlling the UE's connection mobility. For example, the measurement control message may comprise measurement configuration and/or report configuration.

In step S1203, the UE may transmit a measurement report message to the source cell. The measurement report message may comprise a result of measurement on neighbor cell(s) around the UE which can be detected by the UE. The UE may generate the measurement report message according to a measurement configuration and/or measurement control information in the measurement control message received in step S1201.

In step S1205, the source cell may make a handover (HO) decision based on the measurement report. For example, the source cell may make a HO decision and determine candidate target cells (e.g., target cell 1 and target cell 2) for HO among neighbor cells around the UE based on a result of measurement (e.g., signal quality, reference signal received power (RSRP), reference signal received quality (RSRQ)) on the neighbor cells.

In step S1207, the source cell may transmit HO request messages to the target cell 1 and the target cell 2 which are determined in step S1205. That is, the source cell may perform handover preparation with the target cell 1 and the target cell 2. The HO request message may comprise necessary information to prepare the handover at the target side (e.g., target cell 1 and target cell 2).

In step S1209, each of the target cell 1 and the target cell 2 may perform an admission control based on information included in the HO request message. The target cell may configure and reserve the required resources (e.g., C-RNTI and/or RACH preamble). The AS-configuration to be used in the target cell can either be specified independently (i.e. an "establishment") or as a delta compared to the AS-configuration used in the source cell (i.e. a "reconfiguration").

In step S1211, the target cell and the target cell 2 may transmit a HO request acknowledge (ACK) message to the source cell. The HO request ACK message may comprise information on resources reserved and prepared for a handover. For example, the HO request ACK message may comprise a transparent container to be sent to the UE as an RRC message to perform the handover. The container may include a new C-RNTI, target gNB security algorithm identifiers for the selected security algorithms, a dedicated RACH preamble, and/or possibly some other parameters i.e. access parameters, SIBs. If RACH-less handover is configured, the container may include timing adjustment indication and optionally a preallocated uplink grant. The HO request ACK message may also include RNL/TNL information for forwarding tunnels, if necessary. As soon as the source cell receives the HO request ACK message, or as soon as the transmission of the handover command is initiated in the downlink, data forwarding may be initiated.

In step S1213, the source cell may transmit a conditional HO (CHO) configuration to the UE. The CHO configuration may be also referred to as conditional reconfiguration. The CHO configuration may comprise a CHO configuration for each of the candidate target cells (e.g., target cell 1, target cell 2). For example, the CHO configuration may comprise a CHO configuration for the target cell 1, and a CHO configuration for the target cell 2. The CHO configuration for the target cell 1 may comprise a handover condition for the target cell 1, and a handover command of the target cell 1. The handover command of the target cell 1 may comprise RRC reconfiguration parameters for a handover to the target cell 1, including information on resources reserved for the handover to the target cell 1. Similarly, the CHO configuration for the target cell 2 may comprise a handover condition for the target cell 2, and a handover command of the target cell 2. The handover command of the target cell 2 may comprise RRC reconfiguration parameters for a handover to the target cell 2, including information on resources reserved for the handover to the target cell 2.

In step S1215, the UE may perform an evaluation of the handover condition for the candidate target cells (e.g., target cell 1, target cell 2) and select a target cell for handover among the candidate target cells. For example, the UE may perform measurements on the candidate target cells, and determine whether a candidate target cell satisfies a handover condition for the candidate target cell among the candidate target cells based on a result of the measurements on the candidate target cells. If the UE identifies that the target cell 1 satisfies a handover condition for the target cell 1, the UE may select the target cell 1 as a target cell for the handover.

In step S1217, the UE may perform a random access to the selected target cell (e.g., target cell 1). For example, the UE may transmit a random access preamble to the target cell 1, and receive a random access response comprising an uplink grant from the target cell 1. If RACH-less handover is configured, the step S1217 may be omitted, and the uplink grant may be provided in step S1213.

In step S1219, the UE may transmit a HO complete message to the target cell 1. When the UE has successfully accessed the target cell 1 (or, received uplink grant when RACH-less HO is configured), the UE may transmit a HO complete message comprising a C-RNTI to confirm the handover, along with uplink buffer status report, whenever possible, to the target cell 1 to indicate that the handover procedure is completed for the UE. The target cell 1 may verify the C-RNTI transmitted in the HO complete message.

In step S1221, the target cell 1 may transmit a sequence number (SN) status request message to the source cell. The target cell 1 may request the source cell to inform the target cell 1 of a SN of a packet the target cell 1 has to transmit after the handover, via the SN status request message.

In step S1223, the source cell may transmit a CHO cancellation message to the target cell 2 which is not selected as a target cell for a handover among the candidate target cells. After receiving the CHO cancellation message, the target cell 2 may release resources that are reserved in case of a handover.

In step S1225, the target cell 2 may transmit a CHO cancellation confirmation message to the source cell, as a response for the CHO cancellation message. The CHO cancellation confirmation message may inform that the target cell 2 has released resources reserved in case of a handover.

In step S1227, the source cell may transmit a SN status transfer message to the target cell 1, as a response for the SN status request message. The SN status transfer message may inform the target cell 1 of a SN of a packet the target cell 1 has to transmit after the handover.

In step S1229, the source cell may perform a data forwarding to the target cell 1. For example, the source cell may forward data received from a core network to the target cell 1 so that the target cell 1 can now transmit the data to the UE.

In a wireless communication system such as 5G NR, one of the possible enhanced handover mechanisms may comprise RACH-less handover in which the UL grant can be allocated either by the RRC signalling or through the PDCCH in target RAN node. During developing the RACH-less function, since there is no RACH preamble transmission and random access response reception in the RACH-less procedure, UE time adjustment value can be wrong in the target cell for handover. Then UE may set initial transmission power to the insufficiently low level due to wrongly estimated path loss. Thus, the UE may be able to revert to performing RACH procedure before an expiry of the T304 timer to handle above kind of errors during the RACH-less handover.

However, there may be further consideration to resolve potential errors. The UE may not have enough time to ramp power up for initial access to the target cell in the RACH procedure when the UE reverts to RACH procedure from RACH-less procedure. Since, in this case, the UE already wasted some time in a period of the T304 timer to RACH-less handover, the UE should use only rest of the time in the period of the T304 timer for RACH procedure. Furthermore, reverting to RACH procedure may not always be a solution if the above errors are caused by a signal quality of the target cell. Since it is desired to achieve almost 0 ms delay in performing handover, preventing radio link failure in any case may be required.

Therefore, the present disclosure provides solutions to prevent radio link failure, reduce data latency and/or achieve more successful handover when RACH-less handover is stopped and/or failed. For example, the present disclosure provides a method for performing a mobility by a UE in a wireless communication system, the method comprising: receiving information from a serving cell about target cells for mobility, skip information, reverting condition, and/or power information for random access procedure; terminating skipping of random access procedure to access target cell based on the skip information when the reverting condition is satisfied while UE is trying to receive uplink grant or transmit uplink data to the target cell for skipping of the random access procedure; and transmitting random access preamble to the target cell based on an updated transmission power, instead of initial transmission power for the random access preamble transmission, after terminating skipping of the random access procedure.

The wireless device may, before receiving information from a serving cell about target cells for mobility, skip information, reverting condition, and/or power information for random access procedure, perform an initial access towards a cell. The cell may become a serving cell for the wireless device after the initial access.

For example, the updated transmission power for random access preamble transmission may be determined by the power information for the target cell provided from the serving cell.

For another example, the updated transmission power for random access preamble transmission may be determined by time for skipping of the random access procedure. Namely, the updated transmission power may be set by the UE based on a calculation of how many random access attempts could be tried during the time for skipping of the random access procedure.

Figure 13:
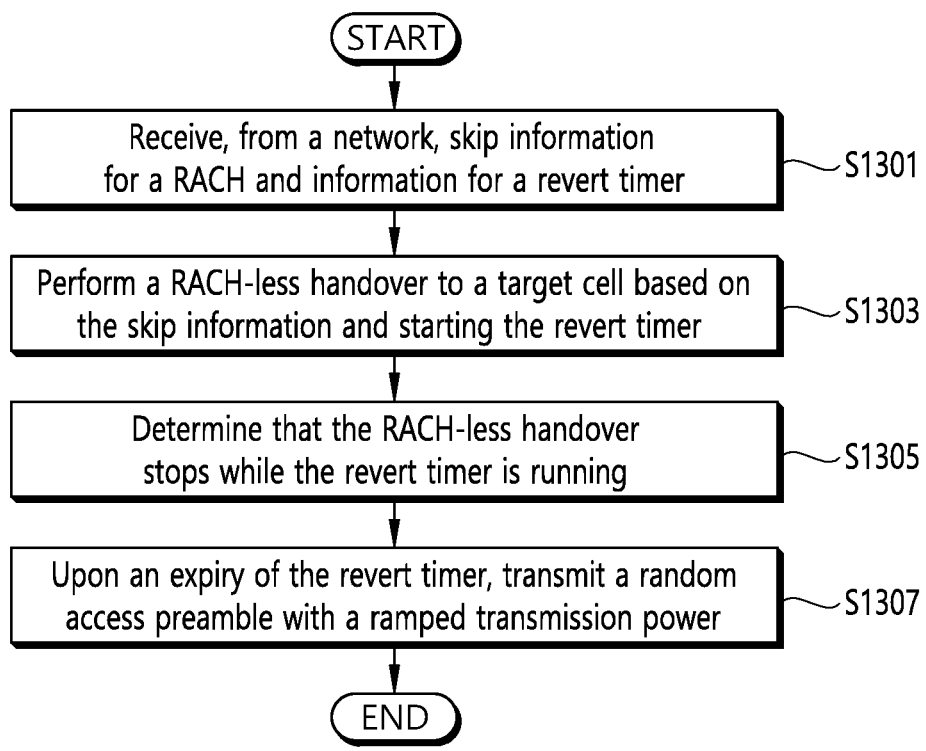
FIG. 13 shows an example of a method for a mobility according to an embodiment of the present disclosure.

FIG. 13 shows an example of a method for a mobility according to an embodiment of the present disclosure. The steps illustrated in FIG. 13 may be performed by a wireless device and/or a UE. FIG. 13 illustrates features for handover exemplary, but the illustrated steps can also be applied to mobility.

Referring to FIG. 13, in step S1301, the wireless device may receive, from a network, skip information for a random access channel (RACH) and information for a revert timer. For example, the wireless device may receive this information from a source cell or a RAN node related to the source cell. The skip information may be information instructing to skip a random access for a target cell in a handover to the target cell. The skip information can also be referred to as RACH skip information for RACH-less handover, or skip information for RACH-less handover. The revert timer may be related to a time period during which the wireless device performs RACH-less handover. That is, while the revert timer is running, the wireless device performs RACH-less handover, and upon an expiry of the revert timer, the wireless device stops performing the RACH-less handover.

In step S1303, the wireless device may perform a RACH-less handover to a target cell based on the skip information and starting the revert timer. The wireless device may start the revert timer upon receiving the information for the revert timer.

In step S1305, the wireless device may determine that the RACH-less handover stops while the revert timer is running. That is, the wireless device may determine that the RACH-less handover does not succeed while the revert timer is running.

In step S1307, upon an expiry of the revert timer, the wireless device may transmit a random access preamble with a ramped transmission power. That is, the wireless device may perform a RACH-based handover with the ramped transmission power upon an expiry of the revert timer. The ramped transmission power may be higher than an initial transmission power of the random access preamble.

For another example, a method for performing a mobility by the wireless device may comprise: receiving, from a network, skip information for a random access channel (RACH) and information for a revert timer; starting the revert timer in response to/upon/after receiving the information for the revert timer; performing a RACH-less handover to a target cell based on the skip information while the revert timer is running; and upon an expiry of the revert timer, stopping (or, terminating) the RACH-less handover and transmitting a random access preamble with a ramped transmission power. The ramped transmission power may be higher than an initial transmission power for a transmission of the random access preamble.

According to various embodiments, any random access preamble may not be transmitted while the revert timer is running. The random access preamble may be a random access preamble that is transmitted first during a time period for a handover, or while a validity timer is running. The validity timer may be related to a time period during which the handover command is valid. That is, the wireless device can perform a handover attempt (RACH-based handover or RACH-less handover) to the target cell based on the handover command while the validity timer is running. When the validity timer expires, the wireless device may determine that the handover attempt failed and stop performing the handover attempt to the target cell. The wireless device may start the validity timer upon receiving information for the validity timer. An example of the validity timer may be a T304 timer.

According to various embodiments, the wireless device may receive, from the network, a handover command for a handover to the target cell and a validity timer for the handover command. The revert timer may expire while the validity timer is running According to various embodiments, the wireless device may receive, from a base station related to a source cell, system information comprising a first initial preamble power and a first power-ramping factor. The first power ramping factor and the first initial preamble power may be common value for wireless devices attached to the source cell including the wireless device. A preamble transmission power may be determined based on a sum of the first initial preamble power and a multiplication of minus 1 from a preamble transmission counter by the first power-ramping factor. The initial preamble power may correspond to (or, be mapped to/related to) higher layer parameter preambleInitialReceivedTargetPower. The power-ramping factor may correspond to (or, be mapped to/related to) higher layer parameter powerRamingStep. The preamble transmission counter may correspond to (or, be mapped to/related to) the number of preamble transmissions, or UE variable PREAMBLE_TRANSMISSION_COUNTER.

According to various embodiments, the initial transmission power of the random access preamble may be the preamble transmission power in which the preamble transmission counter is set to 1.

According to various embodiments, the wireless device may receive, from the base station related to the source cell, information for a second power-ramping factor. The ramped transmission power may be the preamble transmission power in which the first power-ramping factor is substituted for the second power-ramping factor. A value of the second power-ramping factor may be higher than that of the first power-ramping factor. The information for the second power-ramping factor may be received by the wireless device after the system information is received by the wireless device. The second power-ramping factor may be dedicated value for the wireless device, while the first power-ramping factor may be a cell-specific value for wireless devices in the source cell.

According to various embodiments, the wireless device may receive, from the base station related to the source cell, information for a second initial preamble power. The ramped transmission power may be the preamble power in which the first initial preamble power is substituted for the second initial preamble power. The second initial preamble power may be higher than the first initial preamble power. The information for the second initial preamble power may be received by the wireless device after the system information is received by the wireless device. The second initial preamble power may be dedicated value for the wireless device, while the first initial preamble power may be a cell-specific value for wireless devices in the source cell.

According to various embodiments, the wireless device may receive, from the base station related to the source cell, an average back-off indicator for a time period for the RACH-less handover. The wireless device may determine an assumed number of random access trials during the time period for the RACH-less handover based on the average back-off indicator. The ramped transmission power may be the preamble transmission power in which the preamble transmission counter is set to the assumed number of random access trials. The assumed number of random access trials during the time period for the RACH-less handover may be the number of random access trials that are assumed to have been performed during a time period for a RACH-less handover if a RACH-based handover instead of the RACH-less handover had been performed during that time period.

According to various embodiments, the wireless device may receive, from the base station related to the source cell, an average random access trial time for a time period for the RACH-less handover. The wireless device may determine an assumed number of random access trials during the time period for the RACH-less handover based on the average random access trial time. The ramped transmission power may be the preamble transmission power in which the preamble transmission counter is set to the assumed number of random access trials.

According to various embodiments, the wireless device may determine an assumed number of random access trials during a time period for the RACH-less handover based on a length of the time period for the RACH-less handover. The ramped transmission power may be the preamble transmission power in which the preamble transmission counter is set to the assumed number of random access trials.

According to various embodiments, the wireless device may determine an assumed value of a back-off indicator during the time period for the RACH-less handover based on the length of the time period for the RACH-less handover. The wireless device may determine the assumed number of random access trials based on the assumed value of the back-off indicator.

According to various embodiments, the assumed number of random access trials may be greater than 1.

Figure 14:
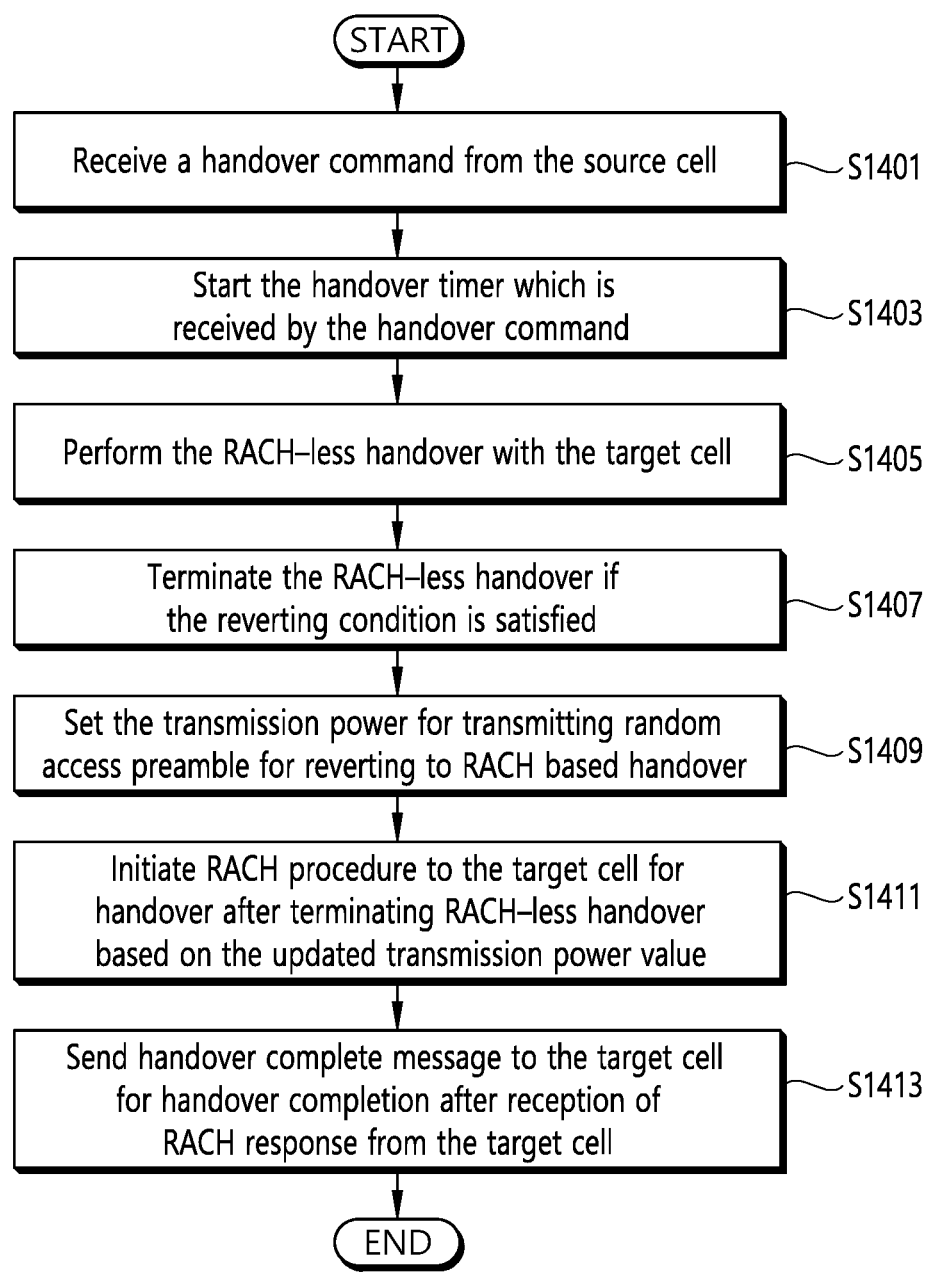
FIG. 14 shows an example of a method for performing a mobility by a UE according to an embodiment of the present disclosure.

FIG. 14 shows an example of a method for performing a mobility by a UE according to an embodiment of the present disclosure. The steps illustrated in FIG. 14 may be performed by a wireless device and/or a UE. FIG. 14 illustrates features for handover exemplary, but the illustrated steps can also be applied to mobility.

Referring to FIG. 14, in step S1401, the UE may receive a handover command from a source cell. The handover command may include target cell information and/or RACH skip information for RACH-less handover. Furthermore, the handover command may include reverting condition, and/or power information for reverting to RACH-based handover procedure from the RACH—less handover. The handover command may be provided to the UE by RRC dedicated signalling or broadcast information such as system information.

The reverting condition may be configured to stop performing RACH-less handover before expiry of the validity timer (e.g. T304 timer). An example of the reverting condition may comprise a revert timer. When the reverting timer is expired, the UE may stop performing RACH-less handover and try RACH-based handover to access the target cell.

The power information may be configured to set transmission power for transmitting random access preamble when the UE determines to revert from performing RACH-less handover to performing RACH-based handover. As the power information, the network may provide at least one of power-ramping factor, initial preamble power, average back-off indictor value or average random access trial time. Details of the power information will be described in below.

In step S1403, the UE may start the validity timer (e.g. T304 timer) which is received by the handover command.

In step S1405, the UE may perform the RACH—less handover towards the target cell. The UE may receive an uplink grant from the target cell and transmit uplink RRC signalling (e.g. RRCReconfigurationComplete, which may comprise handover complete message) to the target cell based on the received uplink grant without RACH procedure for handover.

In step S1407, the UE may terminate the RACH—less handover if the reverting condition is satisfied. For example, the UE may terminate the RACH-less handover when the reverting timer, which has been started when the RACH—less handover is initiated and the reverting timer is received, is expired while the validity timer (e.g. T304 timer) is running.

In step S1409, the UE may set the transmission power for transmitting random access preamble for reverting to RACH-based handover. The UE may set the transmission power for transmitting random access preamble based on the power information provided by the source cell (i.e. network based power setting), or the UE may set the transmission power for transmitting random access preamble by calculating the transmission power considering the elapsed time the RACH-less handover is tried (i.e. UE based power setting).

1) Network Based Power Setting

To set the updated (i.e., ramped) transmission power for random access preamble transmission, the network may provide the power information comprising at least one of:

Power ramping factor (i.e., powerRampingStep): The power ramping factor may be a factor for ramping power and a value assumed by the network if the UE performed RACH-based handover instead of RACH-less handover and has tried random access so far. When the power ramping factor is received for the power information, the UE may set the transmission power value based on the power ramping factor instead of the previous power ramping factor which was received before. That is, the power ramping factor for the power information may override the previous powerRampingStep of RACH-ConfigCommon in the system information (e.g., system information block type 2 (SIB2)).

Initial preamble power (i.e., preambleInitialReceivedTargetPower): The initial preamble power may be a value for initial preamble power and a value assumed by network to prevent random access failure. When the initial preamble power is received for the power information, the UE may update the transmission power value based on the initial preamble power instead of the previous initial preamble power which was received before. That is, the initial preamble power for the power information may override the previous preambleInitial- ReceivedTargetPower of RACH-ConfigCommon in system information (e.g., SIB2).

Average back-off indicator: The average back-off indicator may be averaged value of all possible back-off indicator values, which could be provided in sub header of the random access response whenever the UE does not successfully performed contention resolution, if the network assumes that the UE performed RACHObased handover instead of RACH-less handover. When the average back-off indicator is received for the power information, the UE may calculate the assuming number of random access trial based on the average back-off indicator for the time of RACH-less handover as if the random access had been tried instead of the RACH-less handover from when the handover started. Then, the UE may ramp up the power ramping factor which is received before, according to the calculated assuming number of the random access trials. For example, the UE may set powerRampingStep not to the initial value (e.g. zero) but to the assumed number of random access trials.

Average random access trial time: The average random access trial time may be averaged value of all period for possible random access trials which are considered back-off time. When the average random access trial time is received for the power information, the UE may calculate the assumed number of random access trial based on the average random access trial time for the time of RACH-less handover as if the random access had been tried instead of the RACH-less handover from when the handover started. Then, the UE may ramp up the power ramping factor which is received before, according to the calculated assumed number of the random access trials. For example, the UE may set powerRampingStep not to the initial value (e.g. zero) but to the assumed number of random access trials.

2) UE Based Power Setting

To set the updated transmission power for random access preamble transmission, the UE may calculate the assumed number of random access trials without any received information from the network for the time of RACH-less handover as if the random access had been tried instead of the RACH-less handover from when the handover started. In this case, the UE may assume a certain value as back-off indicator tentatively and may apply the previous received RACH parameters (e.g., initial preamble power, and/or power-ramping factor) for the random access if there isn't any RACH related information in the handover command. Then, the UE may ramp up the power ramping value which is received before, according to the calculated assumed number of random access trials. For example, the UE may set powerRampingStep not to the initial value (e.g. zero) but to the assumed number of random access trials. For another example, the UE may set the preamble transmission counter not to the initial value (e.g., zero) but to the assumed number of random access trials.

In step S1411, for transmitting random access preamble to the target cell, the UE may use the updated transmission power value instead of the initial transmission power, and initiate RACH procedure to the target cell for handover after terminating RACH—less handover.

In step S1413, the UE may send an RRC signalling (i.e. RRCReconfigurationComplete comprising handover complete message) to the target cell for handover completion after reception of RACH response from the target cell.

According to various embodiments, before performing the step S1401, the UE may establish a connection with a source RAN node at a source cell. The UE may perform initial access towards a source cell. The UE and a source cell may perform RACH procedure. The UE may establish or resume a connection with a source RAN node and enter RRC_CONNECTED. The UE may perform AS security activation upon receiving Security Mode Command from the source RAN node. The UE may configure radio bearers and radio configuration upon receiving RRC reconfiguration or resume radio bearers and radio configuration upon receiving RRC resume.

According to various embodiments, after performing the step S1413 (i.e., after completing handover to the target cell), the UE may communicate with a RAN node via the target cell. Thereafter, the UE may perform RRC connection release procedure with the RAN node. The UE may receive RRC release message from the RAN node. Upon receiving the RRC release message, the UE may enter RRC_IDLE and/or RRC_INACTIVE. While in the RRC_IDLE and/or RRC_INACTIVE, the UE may perform cell reselection.

Figure 15:
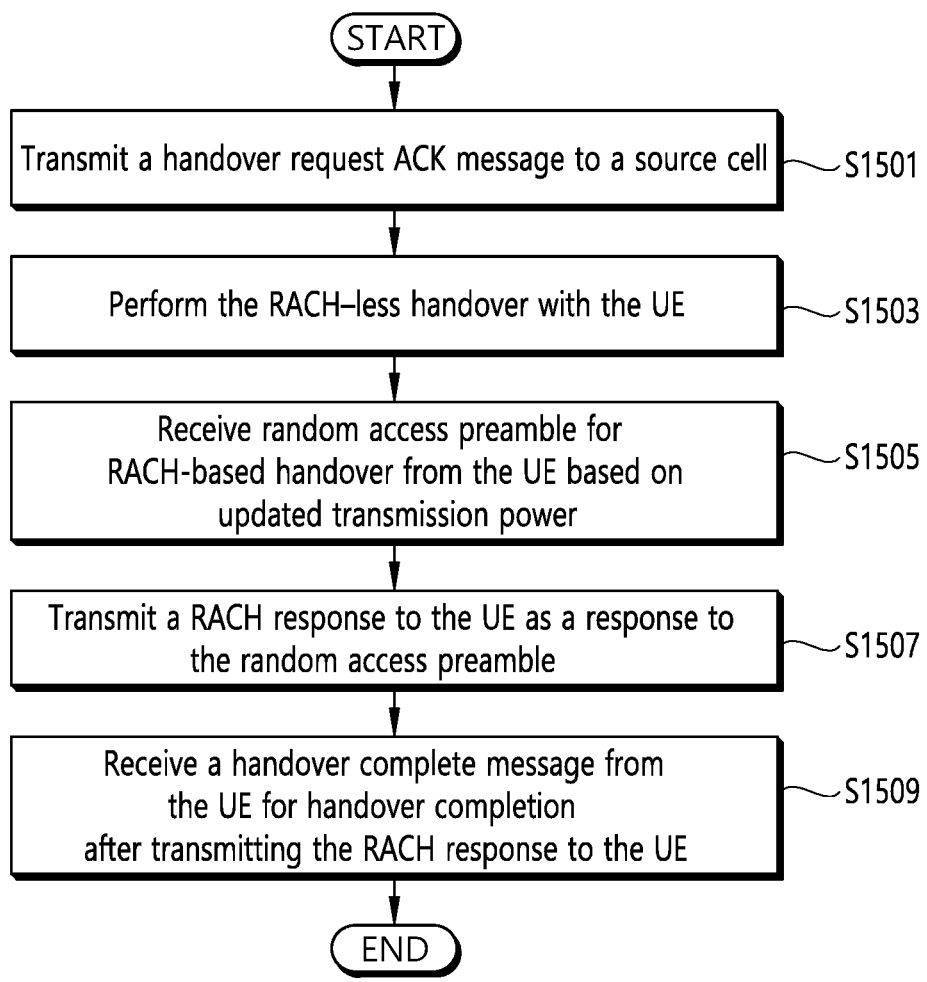
FIG. 15 shows an example of a method for performing a mobility by a RAN node according to an embodiment of the present disclosure.

FIG. 15 shows an example of a method for performing a mobility by a RAN node according to an embodiment of the present disclosure. The steps illustrated in FIG. 15 may be performed by a RAN node related to a target cell for a handover (i.e., target RAN node). FIG. 15 illustrates features for handover exemplary, but the illustrated steps can also be applied to mobility.

Referring to FIG. 15, in step S1501, the target RAN node may transmit a handover request ACK message to a RAN node related to a source cell for a handover (i.e., source RAN node). The target RAN node may receive a handover request message from the source RAN node, and in response, may transmit the handover request ACK message to the source RAN node. After receiving the handover request ACK message from the target RAN node, the source RAN node may transmit a handover command to the UE. The handover command may include target cell information and/or RACH skip information for RACH-less handover. Furthermore, the handover command may include reverting condition, and/or power information for reverting to RACH-based handover procedure from the RACH—less handover. The handover command may be provided to the UE by RRC dedicated signalling or broadcast information such as system information.

The reverting condition may be configured to stop performing RACH-less handover before expiry of the validity timer (e.g. T304 timer). An example of the reverting condition may comprise a revert timer. When the reverting timer is expired, the UE may stop performing RACH-less handover and try RACH-based handover to access the target cell.

The power information may be configured to set transmission power for transmitting random access preamble when the UE determines to revert from performing RACH-less handover to performing RACH-based handover. As the power information, the network may provide at least one of power-ramping factor, initial preamble power, average back-off indictor value or average random access trial time. Details of the power information will be described in below.

In step S1503, the target RAN node may perform the RACH—less handover with the UE. The target RAN node may transmit uplink grant to the UE and may receive uplink RRC signalling (e.g. RRCReconfigurationComplete comprising handover complete message) from the UE based on the uplink grant without performing RACH procedure for handover.

In step S1505, the RACH-less handover may be terminated by the UE. The target RAN node may receive random access preamble for RACH-based handover from the UE based on updated (or, ramped) transmission power for random access preamble transmission, instead of the initial transmission power. The updated transmission power for random access preamble transmission is determined by network based power setting or UE based power setting as described below:

1) Network Based Power Setting

To set the updated (i.e., ramped) transmission power for random access preamble transmission, the network may provide the power information comprising at least one of:

Power ramping factor (i.e., powerRampingStep): The power ramping factor may be a factor for ramping power and a value assumed by the network if the UE performed RACH-based handover instead of RACH-less handover and has tried random access so far. When the power ramping factor is received for the power information, the UE may set the transmission power value based on the power ramping factor instead of the previous power ramping factor which was received before. That is, the power ramping factor for the power information may override the previous powerRampingStep of RACH-ConfigCommon in the system information (e.g., system information block type 2 (SIB2)).

Initial preamble power (i.e., preambleInitialReceivedTargetPower): The initial preamble power may be a value for initial preamble power and a value assumed by network to prevent random access failure. When the initial preamble power is received for the power information, the UE may update the transmission power value based on the initial preamble power instead of the previous initial preamble power which was received before. That is, the initial preamble power for the power information may override the previous preambleInitialReceivedTargetPower of RACH-ConfigCommon in system information (e.g., SIB2).

Average back-off indicator: The average back-off indicator may be averaged value of all possible back-off indicator values, which could be provided in sub header of the random access response whenever the UE does not successfully performed contention resolution, if the network assumes that the UE performed RACHObased handover instead of RACH-less handover. When the average back-off indicator is received for the power information, the UE may calculate the assuming number of random access trial based on the average back-off indicator for the time of RACH-less handover as if the random access had been tried instead of the RACH-less handover from when the handover started. Then, the UE may ramp up the power ramping factor which is received before, according to the calculated assuming number of the random access trials. For example, the UE may set powerRampingStep not to the initial value (e.g. zero) but to the assumed number of random access trials.

Average random access trial time: The average random access trial time may be averaged value of all period for possible random access trials which are considered back-off time. When the average random access trial time is received for the power information, the UE may calculate the assumed number of random access trial based on the average random access trial time for the time of RACH-less handover as if the random access had been tried instead of the RACH-less handover from when the handover started. Then, the UE may ramp up the power ramping factor which is received before, according to the calculated assumed number of the random access trials. For example, the UE may set powerRampingStep not to the initial value (e.g. zero) but to the assumed number of random access trials.

2) UE Based Power Setting

To set the updated transmission power for random access preamble transmission, the UE may calculate the assumed number of random access trials without any received information from the network for the time of RACH-less handover as if the random access had been tried instead of the RACH-less handover from when the handover started. In this case, the UE may assume a certain value as back-off indicator tentatively and may apply the previous received RACH parameters (e.g., initial preamble power, and/or power-ramping factor) for the random access if there isn't any RACH related information in the handover command. Then, the UE may ramp up the power ramping value which is received before, according to the calculated assumed number of random access trials. For example, the UE may set powerRampingStep not to the initial value (e.g. zero) but to the assumed number of random access trials. For another example, the UE may set the preamble transmission counter not to the initial value (e.g., zero) but to the assumed number of random access trials.

In step S1507, the target RAN node may transmit a RACH response to the UE as a response to the random access preamble.

In step S1509, the target RAN node may receive RRC signalling (i.e. RRCReconfigurationComplete comprising handover complete message) from the UE for handover completion after transmitting the RACH response to the UE.

According to various embodiments, before the source RAN node transmits a handover command to the UE, the source cell and the UE may perform RACH procedure. The UE may establish or resume a connection with a source RAN node and enter RRC_CONNECTED. The UE may perform AS security activation upon receiving Security Mode Command from the source RAN node. The UE may configure radio bearers and radio configuration upon receiving RRC reconfiguration or resume radio bearers and radio configuration upon receiving RRC resume.

According to various embodiments, after the step S1509 (i.e., after completing handover), the RAN node may communicate with UE via the target cell. Thereafter, the RAN node may transmit RRC release message to the UE. Upon receiving the RRC release message, the UE may enter RRC_IDLE and/or RRC_INACTIVE. While in the RRC_IDLE and/or RRC_INACTIVE, the UE may perform cell reselection.

Figure 16:
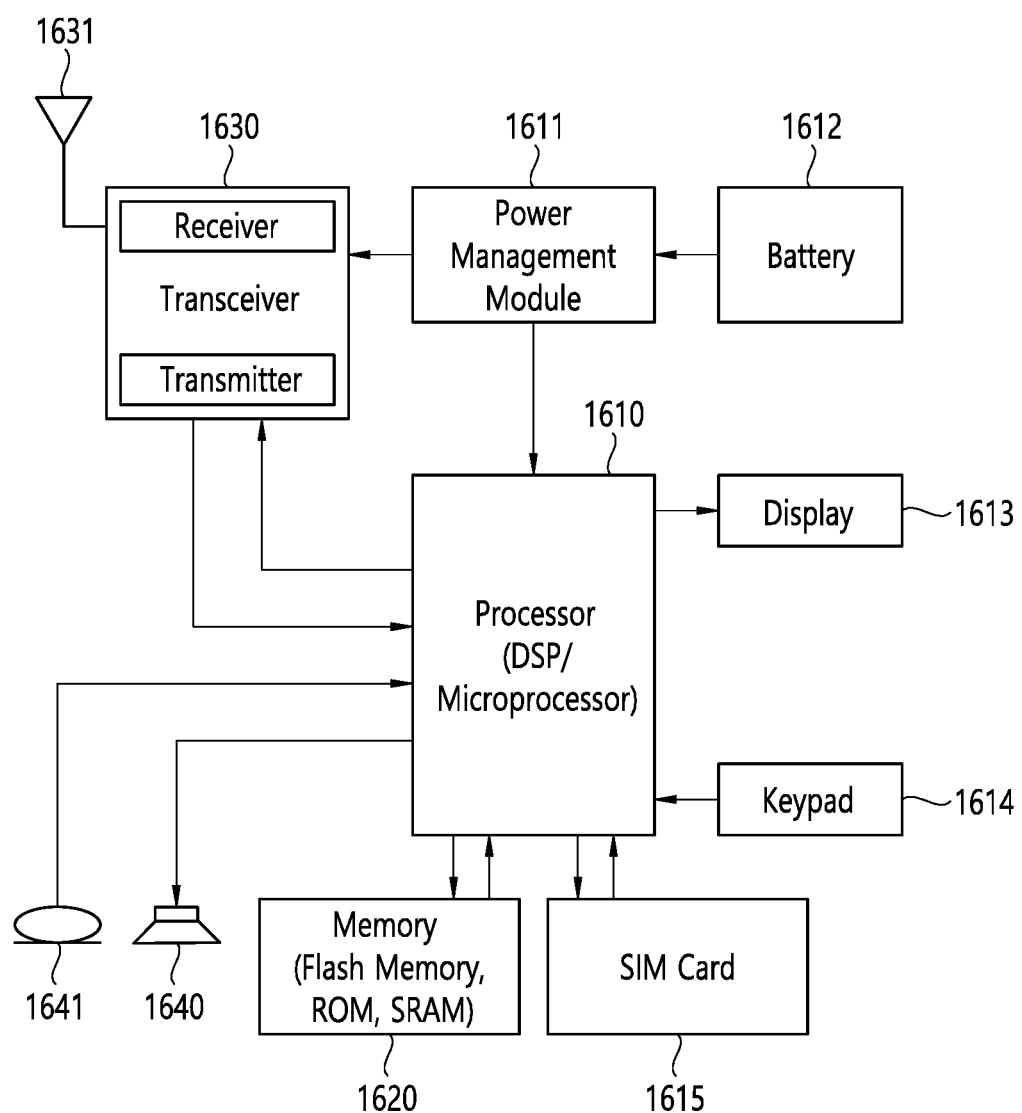
FIG. 16 shows a UE to implement an embodiment of the present disclosure. The present disclosure described above for UE side may be applied to this embodiment.

FIG. 16 shows a UE to implement an embodiment of the present disclosure. The present disclosure described above for UE side may be applied to this embodiment.

A UE includes a processor 1610, a power management module 1611, a battery 1612, a display 1613, a keypad 1614, a subscriber identification module (SIM) card 1615, a memory 1620, a transceiver 1630, one or more antennas 1631, a speaker 1640, and a microphone 1641.

The processor 1610 may be configured to implement proposed functions, procedures and/or methods described in this description. Layers of the radio interface protocol may be implemented in the processor 1610. The processor 1610 may include application-specific integrated circuit (ASIC), other chipset, logic circuit and/or data processing device. The processor 1610 may be an application processor (AP). The processor 1610 may include at least one of a digital signal processor (DSP), a central processing unit (CPU), a graphics processing unit (GPU), a modem (modulator and demodulator). An example of the processor 1610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1610 may be configured to, or configured to control the transceiver 1630 to implement steps performed by the UE and/or the wireless device throughout the disclosure.

The power management module 1611 manages power for the processor 1610 and/or the transceiver 1630. The battery 1612 supplies power to the power management module 1611. The display 1613 outputs results processed by the processor 1610. The keypad 1614 receives inputs to be used by the processor 1610. The keypad 1614 may be shown on the display 1613. The SIM card 1615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1620 is operatively coupled with the processor 1610 and stores a variety of information to operate the processor 1610. The memory 1620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1620 and executed by the processor 1610. The memory 1620 can be implemented within the processor 1610 or external to the processor 1610 in which case those can be communicatively coupled to the processor 1610 via various means as is known in the art.

The transceiver 1630 is operatively coupled with the processor 1610, and transmits and/or receives a radio signal. The transceiver 1630 includes a transmitter and a receiver. The transceiver 1630 may include baseband circuitry to process radio frequency signals. The transceiver 1630 controls the one or more antennas 1631 to transmit and/or receive a radio signal.

The speaker 1640 outputs sound-related results processed by the processor 1610. The microphone 1641 receives sound-related inputs to be used by the processor 1610.

Figure 17:
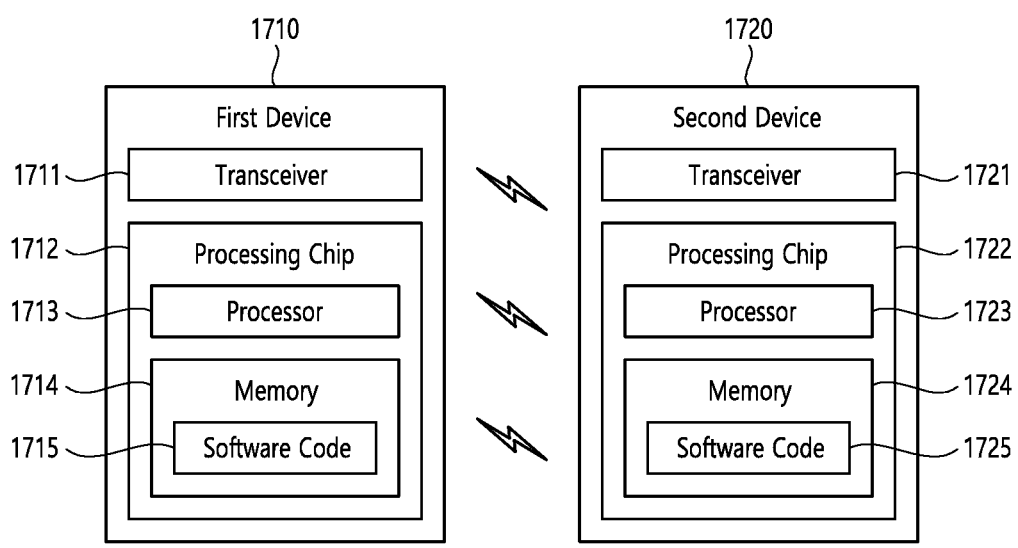
FIG. 17 shows another example of a wireless communication system to which the technical features of the present disclosure can be applied.

FIG. 17 shows another example of a wireless communication system to which the technical features of the present disclosure can be applied.

Referring to FIG. 17, the wireless communication system may include a first device 1710 (i.e., first device 210) and a second device 1720 (i.e., second device 220).

The first device 1710 may include at least one transceiver, such as a transceiver 1711, and at least one processing chip, such as a processing chip 1712. The processing chip 1712 may include at least one processor, such a processor 1713, and at least one memory, such as a memory 1714. The memory may be operably connectable to the processor 1713. The memory 1714 may store various types of information and/or instructions. The memory 1714 may store a software code 1715 which implements instructions that, when executed by the processor 1713, perform operations of the first device 910 described throughout the disclosure. For example, the software code 1715 may implement instructions that, when executed by the processor 1713, perform the functions, procedures, and/or methods of the first device 1710 described throughout the disclosure. For example, the software code 1715 may control the processor 1713 to perform one or more protocols. For example, the software code 1715 may control the processor 1713 to perform one or more layers of the radio interface protocol.

The second device 1720 may include at least one transceiver, such as a transceiver 1721, and at least one processing chip, such as a processing chip 1722. The processing chip 1722 may include at least one processor, such a processor 1723, and at least one memory, such as a memory 1724. The memory may be operably connectable to the processor 1723. The memory 1724 may store various types of information and/or instructions. The memory 1724 may store a software code 1725 which implements instructions that, when executed by the processor 1723, perform operations of the second device 1720 described throughout the disclosure. For example, the software code 1725 may implement instructions that, when executed by the processor 1723, perform the functions, procedures, and/or methods of the second device 1720 described throughout the disclosure. For example, the software code 1725 may control the processor 1723 to perform one or more protocols. For example, the software code 1725 may control the processor 1723 to perform one or more layers of the radio interface protocol.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 18:
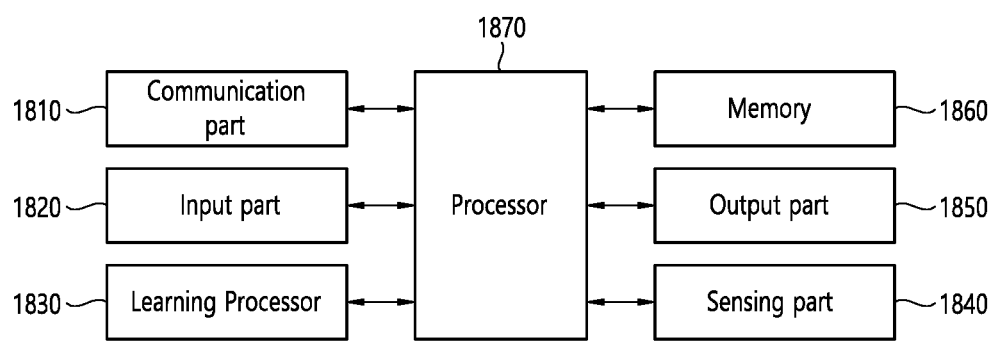
FIG. 18 shows an example of an AI device to which the technical features of the present disclosure can be applied.

FIG. 18 shows an example of an AI device to which the technical features of the present disclosure can be applied.

The AI device 1800 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 18, the AI device 1800 may include a communication part 1810, an input part 1820, a learning processor 1830, a sensing part 1840, an output part 1850, a memory 1860, and a processor 1870.

The communication part 1810 can transmit and/or receive data to and/or from external devices such as the AI devices and the AI server using wire and/or wireless communication technology. For example, the communication part 1810 can transmit and/or receive sensor information, a user input, a learning model, and a control signal with external devices. The communication technology used by the communication part 1810 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1820 can acquire various kinds of data. The input part 1820 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1820 can acquire input data to be used when acquiring an output using learning data and a learning model for model learning. The input part 1820 may obtain raw input data, in which case the processor 1870 or the learning processor 1830 may extract input features by preprocessing the input data.

The learning processor 1830 may learn a model composed of an ANN using learning data. The learned ANN can be referred to as a learning model. The learning model can be used to infer result values for new input data rather than learning data, and the inferred values can be used as a basis for determining which actions to perform. The learning processor 1830 may perform AI processing together with the learning processor of the AI server. The learning processor 1830 may include a memory integrated and/or implemented in the AI device 1800. Alternatively, the learning processor 1830 may be implemented using the memory 1860, an external memory directly coupled to the AI device 1800, and/or a memory maintained in an external device.

The sensing part 1840 may acquire at least one of internal information of the AI device 1800, environment information of the AI device 1800, and/or the user information using various sensors. The sensors included in the sensing part 1840 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1850 may generate an output related to visual, auditory, tactile, etc. The output part 1850 may include a display unit for outputting visual information, a speaker for outputting auditory information, and/or a haptic module for outputting tactile information.

The memory 1860 may store data that supports various functions of the AI device 1800. For example, the memory 1860 may store input data acquired by the input part 1820, learning data, a learning model, a learning history, etc.

The processor 1870 may determine at least one executable operation of the AI device 1800 based on information determined and/or generated using a data analysis algorithm and/or a machine learning algorithm. The processor 1870 may then control the components of the AI device 1800 to perform the determined operation. The processor 1870 may request, retrieve, receive, and/or utilize data in the learning processor 1830 and/or the memory 1860, and may control the components of the AI device 1800 to execute the predicted operation and/or the operation determined to be desirable among the at least one executable operation. The processor 1870 may generate a control signal for controlling the external device, and may transmit the generated control signal to the external device, when the external device needs to be linked to perform the determined operation. The processor 1870 may obtain the intention information for the user input and determine the user's requirements based on the obtained intention information. The processor 1870 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1830 and/or learned by the learning processor of the AI server, and/or learned by their distributed processing. The processor 1870 may collect history information including the operation contents of the AI device 1800 and/or the user's feedback on the operation, etc. The processor 1870 may store the collected history information in the memory 1860 and/or the learning processor 1830, and/or transmit to an external device such as the AI server. The collected history information can be used to update the learning model. The processor 1870 may control at least some of the components of AI device 1800 to drive an application program stored in memory 1860. Furthermore, the processor 1870 may operate two or more of the components included in the AI device 1800 in combination with each other for driving the application program.

Figure 19:
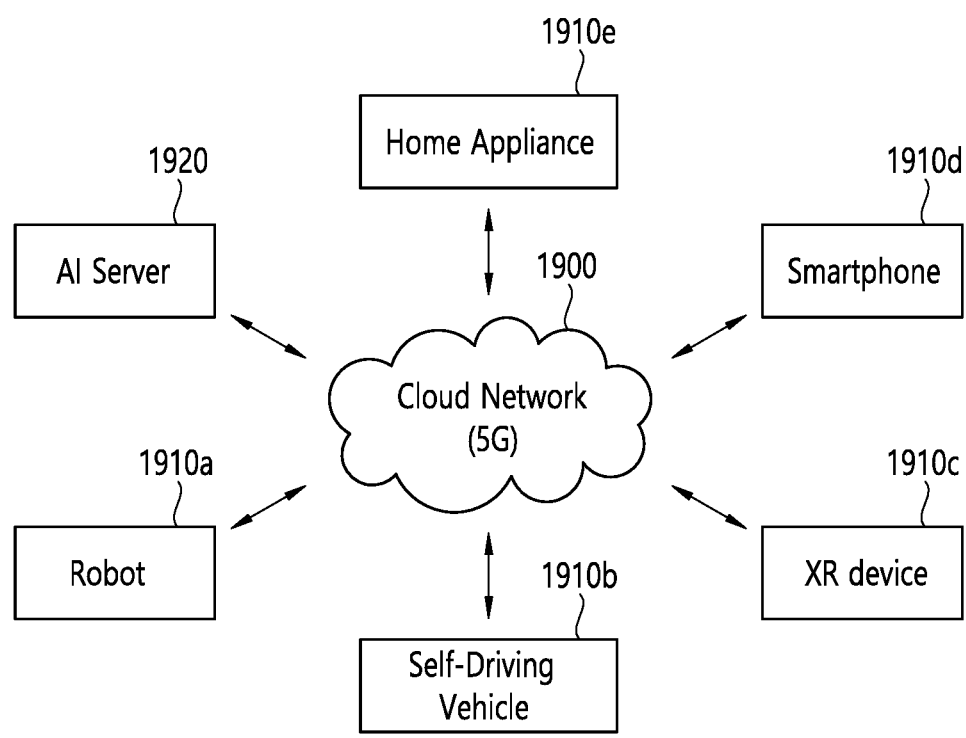
FIG. 19 shows an example of an AI system to which the technical features of the present disclosure can be applied.

FIG. 19 shows an example of an AI system to which the technical features of the present disclosure can be applied.

Referring to FIG. 19, in the AI system, at least one of an AI server 1920, a robot 1910a, an autonomous vehicle 1910b, an XR device 1910c, a smartphone 1910d and/or a home appliance 1910e is connected to a cloud network 1900. The robot 1910a, the autonomous vehicle 1910b, the XR device 1910c, the smartphone 1910d, and/or the home appliance 1910e to which the AI technology is applied may be referred to as AI devices 1910a to 1910e.

The cloud network 1900 may refer to a network that forms part of a cloud computing infrastructure and/or resides in a cloud computing infrastructure. The cloud network 1900 may be configured using a 3G network, a 4G or LTE network, and/or a 5G network. That is, each of the devices 1910a to 1910e and 1920 consisting the AI system may be connected to each other through the cloud network 1900. In particular, each of the devices 1910a to 1910e and 1920 may communicate with each other through a base station, but may directly communicate with each other without using a base station.

The AI server 1920 may include a server for performing AI processing and a server for performing operations on big data. The AI server 1920 is connected to at least one or more of AI devices constituting the AI system, i.e. the robot 1910a, the autonomous vehicle 1910b, the XR device 1910c, the smartphone 1910d and/or the home appliance 1910e through the cloud network 1900, and may assist at least some AI processing of the connected AI devices 1910a to 1910e. The AI server 1920 can learn the ANN according to the machine learning algorithm on behalf of the AI devices 1910a to 1910e, and can directly store the learning models and/or transmit them to the AI devices 1910a to 1910e. The AI server 1920 may receive the input data from the AI devices 1910a to 1910e, infer the result value with respect to the received input data using the learning model, generate a response and/or a control command based on the inferred result value, and transmit the generated data to the AI devices 1910a to 1910e. Alternatively, the AI devices 1910a to 1910e may directly infer a result value for the input data using a learning model, and generate a response and/or a control command based on the inferred result value.

Various embodiments of the AI devices 1910a to 1910e to which the technical features of the present disclosure can be applied will be described. The AI devices 1910a to 1910e shown in FIG. 19 can be seen as specific embodiments of the AI device 1800 shown in FIG. 18.

The present disclosure can have various advantageous effects.

For example, the wireless device transmits a random access preamble with a ramped transmission power instead of an initial transmission power upon terminating a RACH-less handover so that the radio link failure can be prevented, data latency can be reduced (i.e., almost 0 ms delay in performing handover can be achieved), and more successful handover can be performed.

If UE performs RACH-less handover during a time period within a validity period (i.e., while validity timer is running) and then performs RACH-based handover during the rest of the validity period after terminating the RACH-less handover, the UE can use limited time (i.e., the rest of the validity period) for performing the RACH-based handover. During the limited time period, the UE is able to perform more successful handover using the updated transmission power to transmit random access preamble even though RACH-less handover is failed. According to various embodiments, the UE is able to transmit more powerful transmission for random access to the target cell and there are more possibilities to succeed handover.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device comprising:
receiving, from a network, skip information for a random access channel (RACH) and information for a revert timer;
performing a RACH-less handover to a target cell based on the skip information and starting the revert timer;
determining that the RACH-less handover stops while the revert timer is running; and
upon an expiry of the revert timer, transmitting a random access preamble with a ramped transmission power,
wherein the ramped transmission power is higher than an initial transmission power of the random access preamble,
wherein the method further comprises receiving, from a base station related to a source cell, system information comprising a first initial preamble power and a first power-ramping factor,
wherein the first power ramping factor and the first initial preamble power are common values for wireless devices attached to the source cell including the wireless device,
wherein a preamble transmission power is determined based on a sum of the first initial preamble power and a multiplication of minus 1 from a preamble transmission counter by the first power-ramping factor, and
wherein the initial transmission power of the random access preamble is the preamble transmission power in which the preamble transmission counter is set to 1.

2. The method of claim 1, wherein any random access preamble is not transmitted while the revert timer is running, and
wherein the random access preamble is a random access preamble that is transmitted first during a time period for a handover.

3. The method of claim 1, further comprising:
receiving, from the network, a handover command for a handover to the target cell and a validity timer for the handover command,
wherein the revert timer expires while the validity timer is running.

4. The method of claim 1, further comprising:
receiving, from the base station related to the source cell, information for a second power-ramping factor,
wherein the ramped transmission power is the preamble transmission power in which the first power-ramping factor is substituted for the second power-ramping factor, and
wherein a value of the second power-ramping factor is higher than that of the first power-ramping factor.

5. The method of claim 1, further comprising:
receiving, from the base station related to the source cell, information for a second initial preamble power,
wherein the ramped transmission power is the preamble power in which the first initial preamble power is substituted for the second initial preamble power, and
wherein the second initial preamble power is higher than the first initial preamble power.

6. The method of claim 1, further comprising:
receiving, from the base station related to the source cell, an average back-off indicator for a time period for the RACH-less handover; and
determining an assumed number of random access trials during the time period for the RACH-less handover based on the average back-off indicator,
wherein the ramped transmission power is the preamble transmission power in which the preamble transmission counter is set to the assumed number of random access trials.

7. The method of claim 1, further comprising:
receiving, from the base station related to the source cell, an average random access trial time for a time period for the RACH-less handover; and
determining an assumed number of random access trials during the time period for the RACH-less handover based on the average random access trial time,
wherein the ramped transmission power is the preamble transmission power in which the preamble transmission counter is set to the assumed number of random access trials.

8. The method of claim 1, further comprising:
determining an assumed number of random access trials during a time period for the RACH-less handover based on a length of the time period for the RACH-less handover,
wherein the ramped transmission power is the preamble transmission power in which the preamble transmission counter is set to the assumed number of random access trials.

9. The method of claim 8, wherein the determining of the assumed number of random access trials comprises:
determining an assumed value of a back-off indicator during the time period for the RACH-less handover based on the length of the time period for the RACH-less handover; and
determining the assumed number of random access trials based on the assumed value of the back-off indicator.

10. The method of claim 9, wherein the assumed number of random access trials is greater than 1.

11. The method of claim 1, wherein the wireless device is in communication with at least one of a user equipment, a network, or autonomous vehicles other than the wireless device.

12. A wireless device in a wireless communication system comprising:
a transceiver;
a memory; and
at least one processor operatively coupled to the transceiver and the memory, and configured to:
control the transceiver to receive, from a network, skip information for a random access channel (RACH) and information for a revert timer,
perform a RACH-less handover to a target cell based on the skip information and starting the revert timer,
determine that the RACH-less handover stops while the revert timer is running, and
control the transceiver to transmit, upon an expiry of the revert timer, a random access preamble with a ramped transmission power,
wherein the ramped transmission power is higher than an initial transmission power of the random access preamble,
wherein the wireless device further comprises receiving, from a base station related to a source cell, system information comprising a first initial preamble power and a first power-ramping factor,
wherein the first power ramping factor and the first initial preamble power are common values for wireless devices attached to the source cell including the wireless device,
wherein a preamble transmission power is determined based on a sum of the first initial preamble power and a multiplication of minus 1 from a preamble transmission counter by the first power-ramping factor, and
wherein the initial transmission power of the random access preamble is the preamble transmission power in which the preamble transmission counter is set to 1.

13. A processor for a wireless device in a wireless communication system, wherein the processor is configured to control the wireless device to perform operations comprising:
receiving, from a network, skip information for a random access channel (RACH) and information for a revert timer;
performing a RACH-less handover to a target cell based on the skip information and starting the revert timer;
determining that the RACH-less handover stops while the revert timer is running;
upon an expiry of the revert timer, transmitting a random access preamble with a ramped transmission power,
wherein the ramped transmission power is higher than an initial transmission power of the random access preamble,
wherein the processor further comprises receiving, from a base station related to a source cell, system information comprising a first initial preamble power and a first power-ramping factor,
wherein the first power ramping factor and the first initial preamble power are common values for wireless devices attached to the source cell including the wireless device,
wherein a preamble transmission power is determined based on a sum of the first initial preamble power and a multiplication of minus 1 from a preamble transmission counter by the first power-ramping factor, and
wherein the initial transmission power of the random access preamble is the preamble transmission power in which the preamble transmission counter is set to 1.

* * * * *